(12) United States Patent
Appleyard

(10) Patent No.: US 8,190,405 B2
(45) Date of Patent: May 29, 2012

(54) METHOD AND APPARATUS FOR ESTIMATING THE PHYSICAL STATE OF A PHYSICAL SYSTEM

(75) Inventor: John Appleyard, Oxfordshire (GB)

(73) Assignee: Polyhedron Software Ltd., Oxfordshire (GB)

( * ) Notice: Subject to any disclaimer, the term of this patent is extended or adjusted under 35 U.S.C. 154(b) by 555 days.

(21) Appl. No.: 12/277,498

(22) Filed: Nov. 25, 2008

(65) Prior Publication Data

US 2009/0138245 A1 May 28, 2009

(30) Foreign Application Priority Data

Nov. 27, 2007 (GB) .................................. 0723148.3

(51) Int. Cl.
*G06F 17/10* (2006.01)
(52) U.S. Cl. .......................................................... 703/2
(58) Field of Classification Search ...................... 703/2
See application file for complete search history.

(56) References Cited

U.S. PATENT DOCUMENTS

| 6,230,101 B1 | 5/2001 | Wallis |
| 2006/0235667 A1 | 10/2006 | Fung et al. |

OTHER PUBLICATIONS

Appleyard, Nested Factorization 2004, obtained from Applicant's website: http://www.polyhedron.com/nf-Nested_Factorization0htm. The website was updated in 2011. However, the relevant and relied upon teaching is the 2004 paper disclosed in whole at the site. pp. 1-6.*
Yousef Saad, "Iterative Methods for Sparse Linear Systems", Jan. 2000, Second Edition, published by SIAM, ISBN 0-89871-534-2, pp. 1-447.
J.R. Appleyard et al., "Nested factorization", In Seventh SPE Symposium on Reservoir Simulation, pp. 315-324, 1983, paper No. 12264.
Crumpton et al., "Parallel computing—Using ECLIPSE Parallel", Schlumberger Information Solutions, White Paper 2003, www.sis.slb.com/media/about/whitepaper_parallelcomputing.pdf.
Kuznetsova et al., "The Family of Nested Factorizations", Russ J Numer. Anal. Math. Modelling, 2007 vol. 22, No. 4, pp. 393-412.
Demmel et al., "Block LU Factorization", Feb. 16, 1992 available at ftp.netlib.org/lapack/lawns/lawn40.ps, pp. 1-23.
European Search Report for corresponding European Application No. EP 08 25 3783 dated Apr. 16, 2010.
Kuznetsova N.N. et al., "The family of nested factorizations", Russian Journal of Numerical Analysis and Mathematical Modeling, vol. 22, No. 4, Jan. 1, 2007, pp. 393-412, XP009114393.
J.R. Appleyard, et al., "Special techniques for fully-implicit simulators", In Proc. European Symposium on Enhanced Oil Recovery, Bournemouth, UK, pp. 395-408 (1981).

* cited by examiner

*Primary Examiner* — Hugh Jones
(74) *Attorney, Agent, or Firm* — Renner, Otto, Boisselle & Sklar, LLP

(57) ABSTRACT

A computer-implemented method of estimating the physical state of a fluid reservoir with known physical characteristics and subject to specified boundary conditions is provided. The fluid reservoir is represented as a plurality of nodes arranged in N-dimensional space, where N>1, each node representing a discrete finite volume of the fluid reservoir and being associated with a set of physical properties, the physical properties associated with the nodes together forming a vector x when arranged in order, with the vector x representing the physical state of the fluid reservoir, and where the discrete finite volumes together represent the entire fluid reservoir. The method includes for each of a plurality of iterations, estimating a change dx in the vector x that results in all relations being simultaneously satisfied, and at the end of each iteration updating the current value of x according to $x = x + dx$.

36 Claims, 20 Drawing Sheets

Figure 1 – A 4x4x2 Rectangular Grid – NF ordering
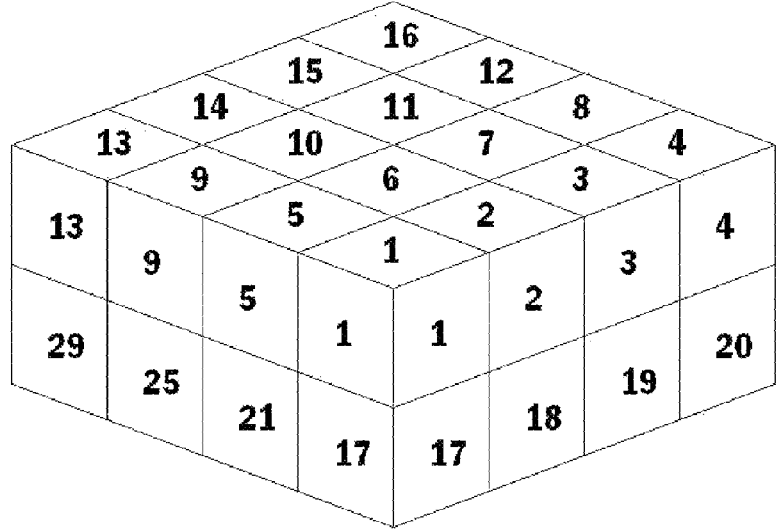
Figure 2 – Matrix Structure for a 4x4x2 Rectangular Grid
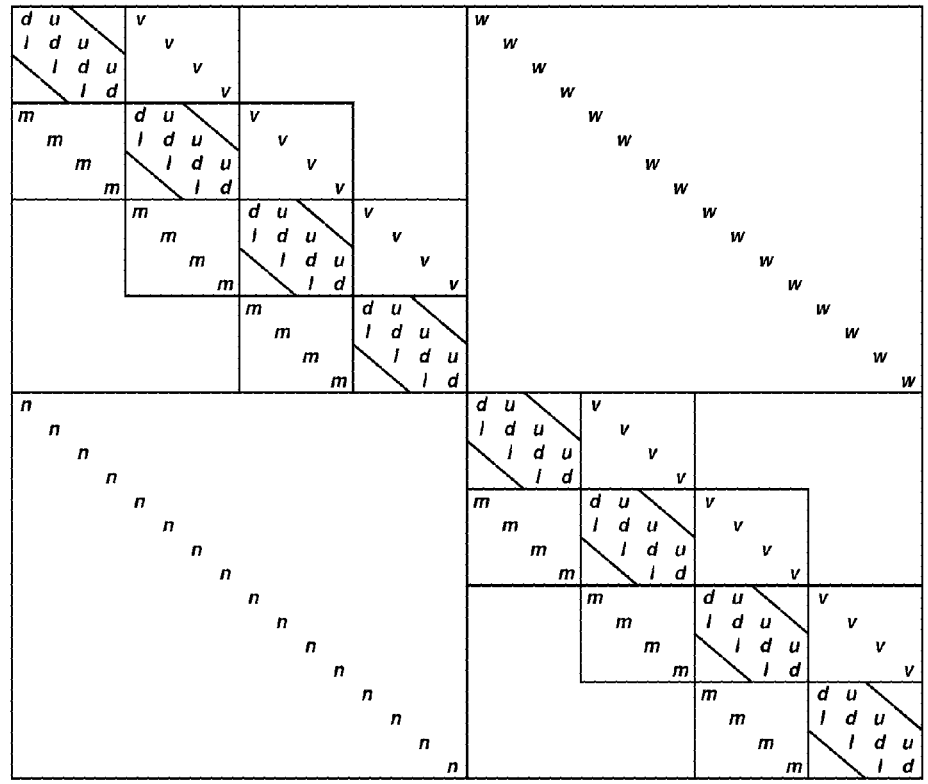

Figure 3 – A 4x4x2 Rectangular Grid – GNF ordering (2x2 supergrid)
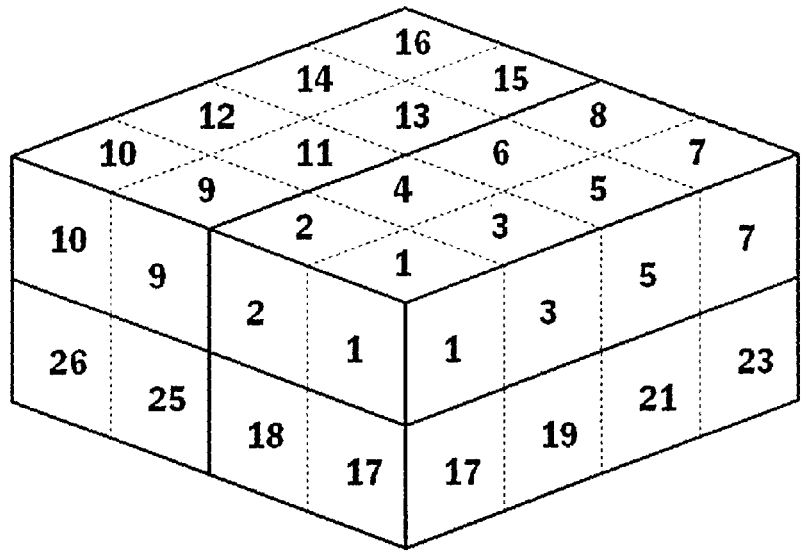
Figure 4 – Matrix Structure for a 4x4x2 Rectangular Grid (revised order)
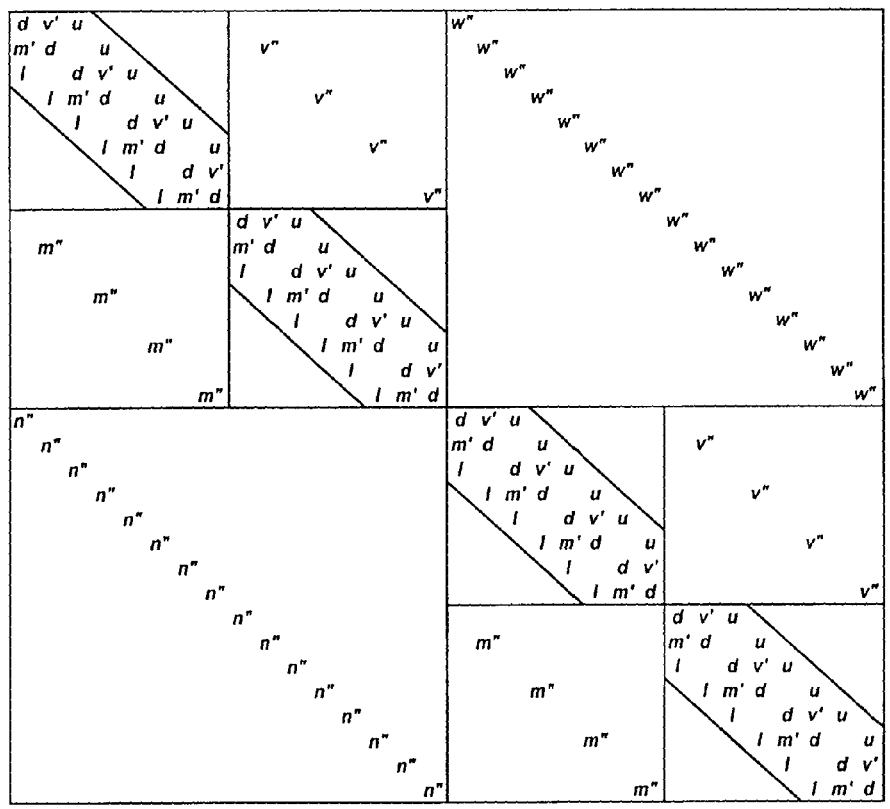

Figures 5A to 5C: "Brick Wall" Supergrids

Figure 5C
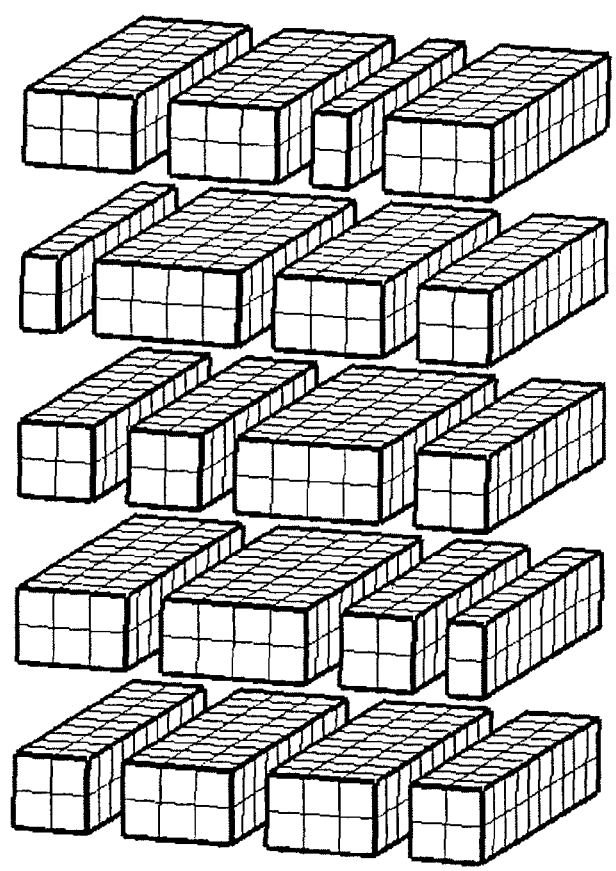
Figure 6 – A Supercell matrix before and after RCM re-ordering (black pixels represent non-zero matrix elements)
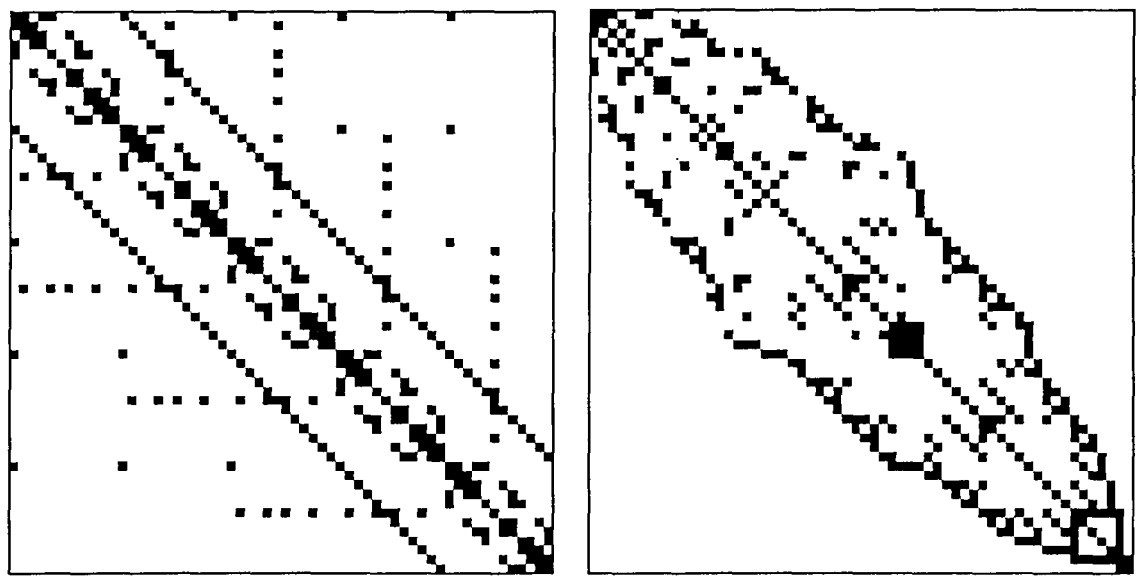

Figure 7 – A Truncated Cone with a Tetrahedral Mesh – side and top views
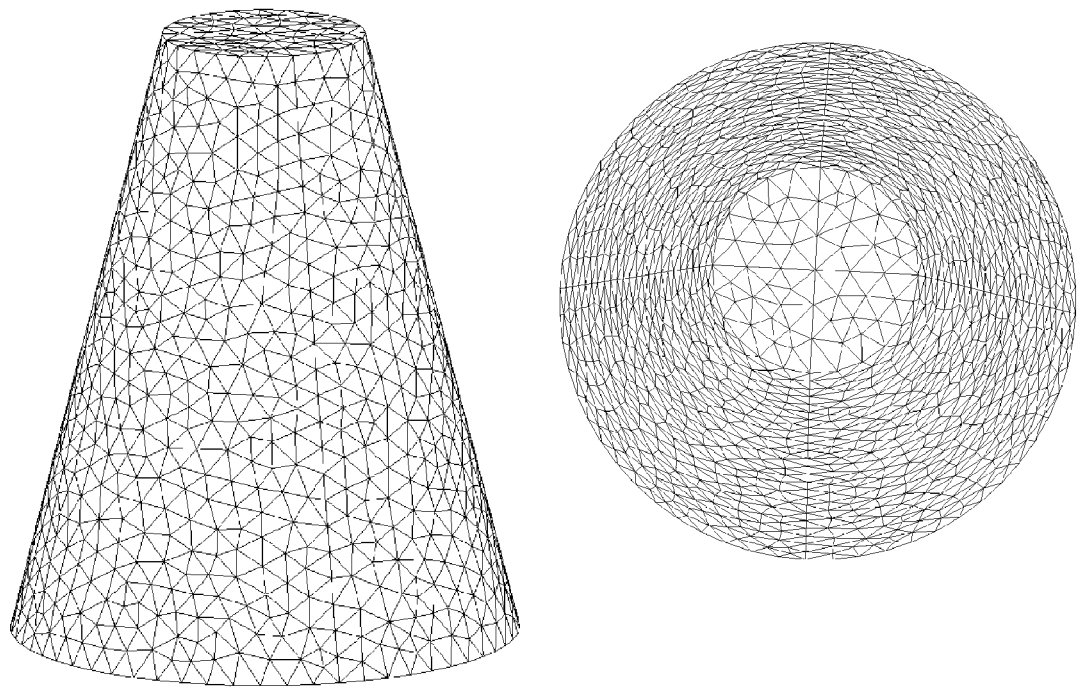
Figure 8 – side view showing how it can be split into layers
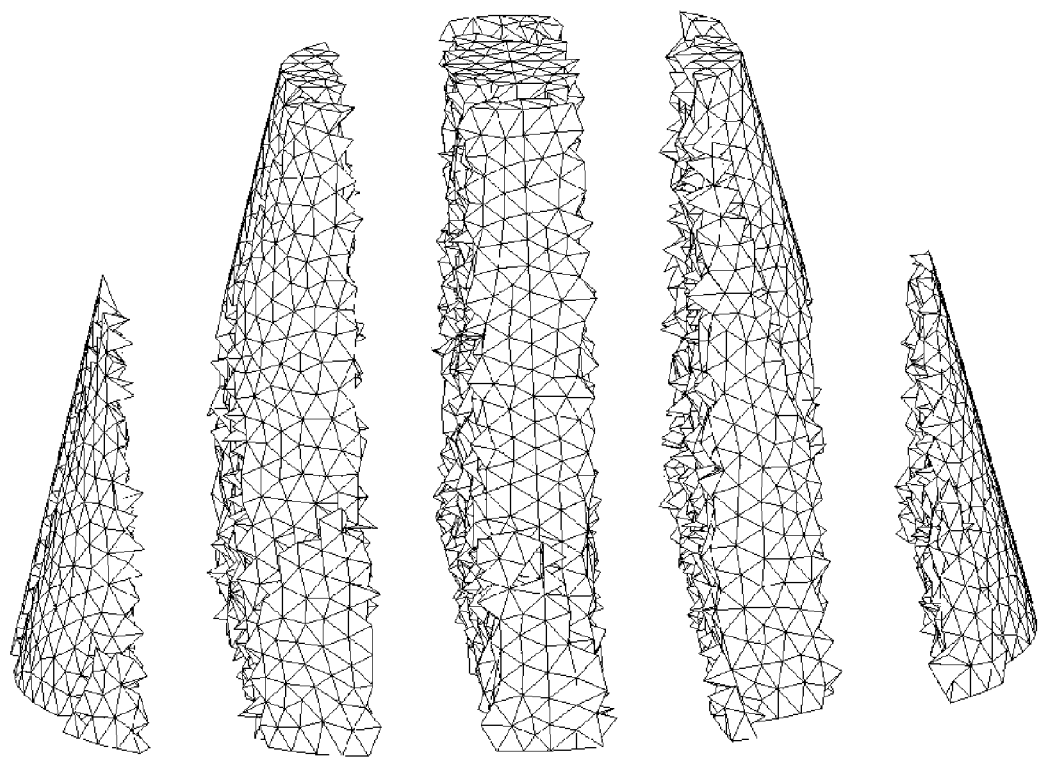

Figure 9 – top view showing how each layer can be split into "supercells"
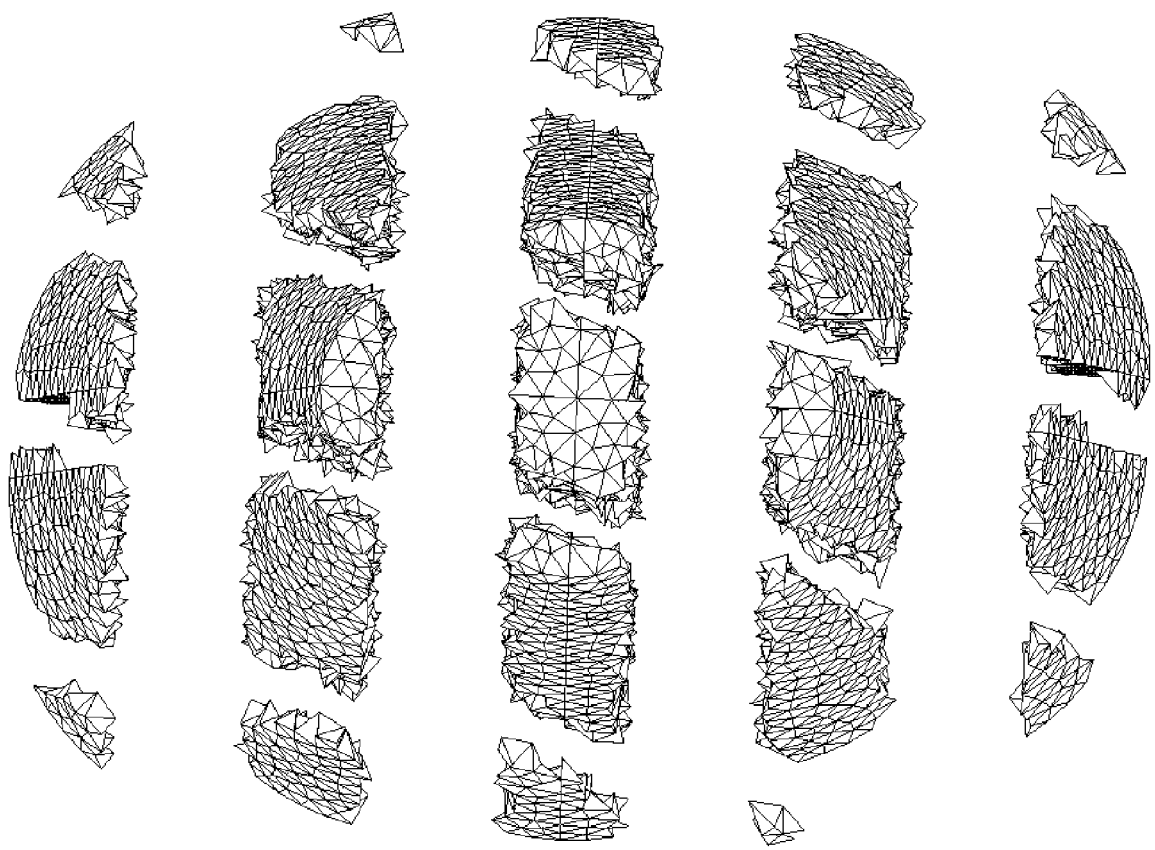

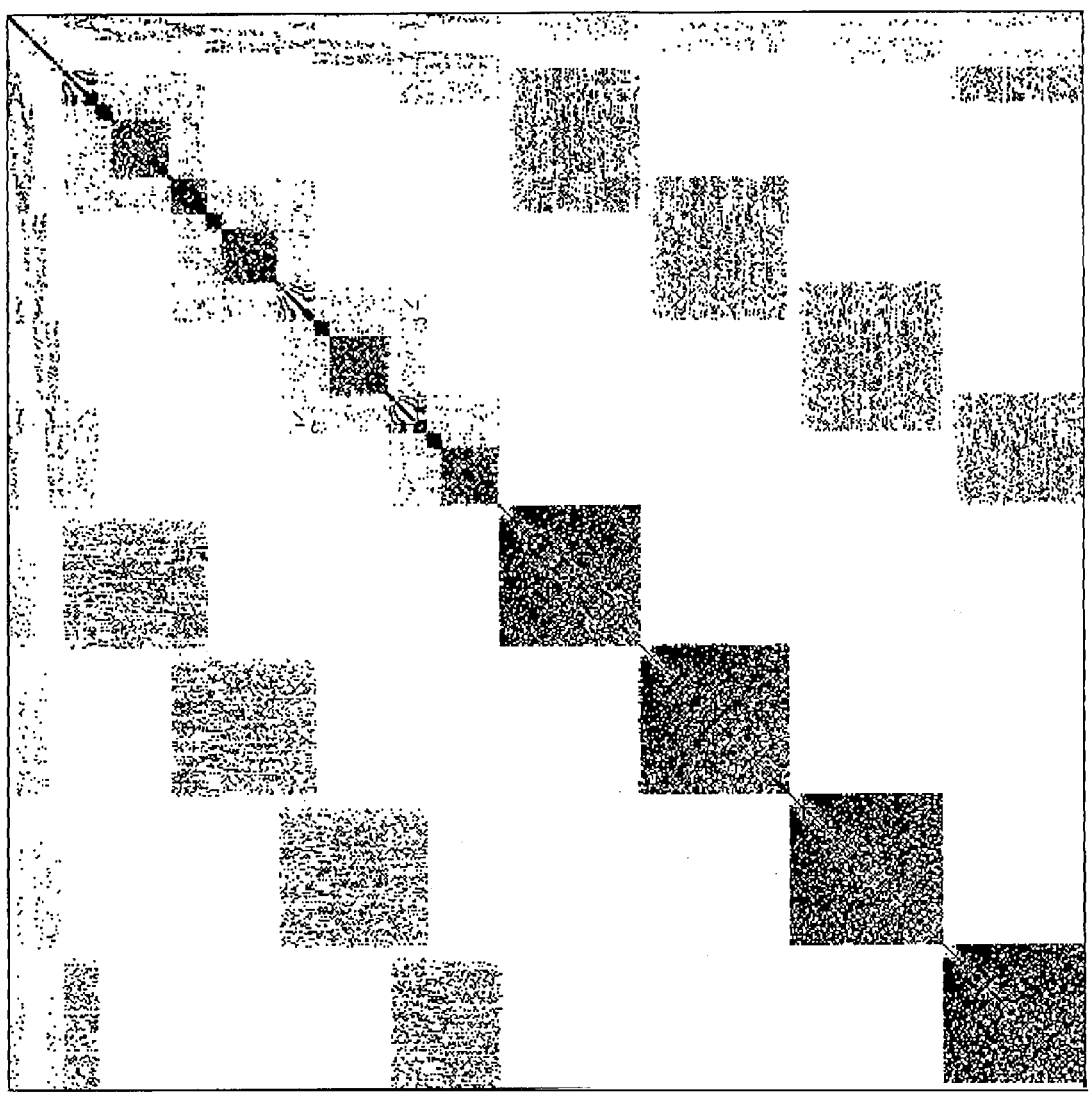
Figure 10 – Original matrix structure for truncated cone (black pixels represent non-zero matrix elements)

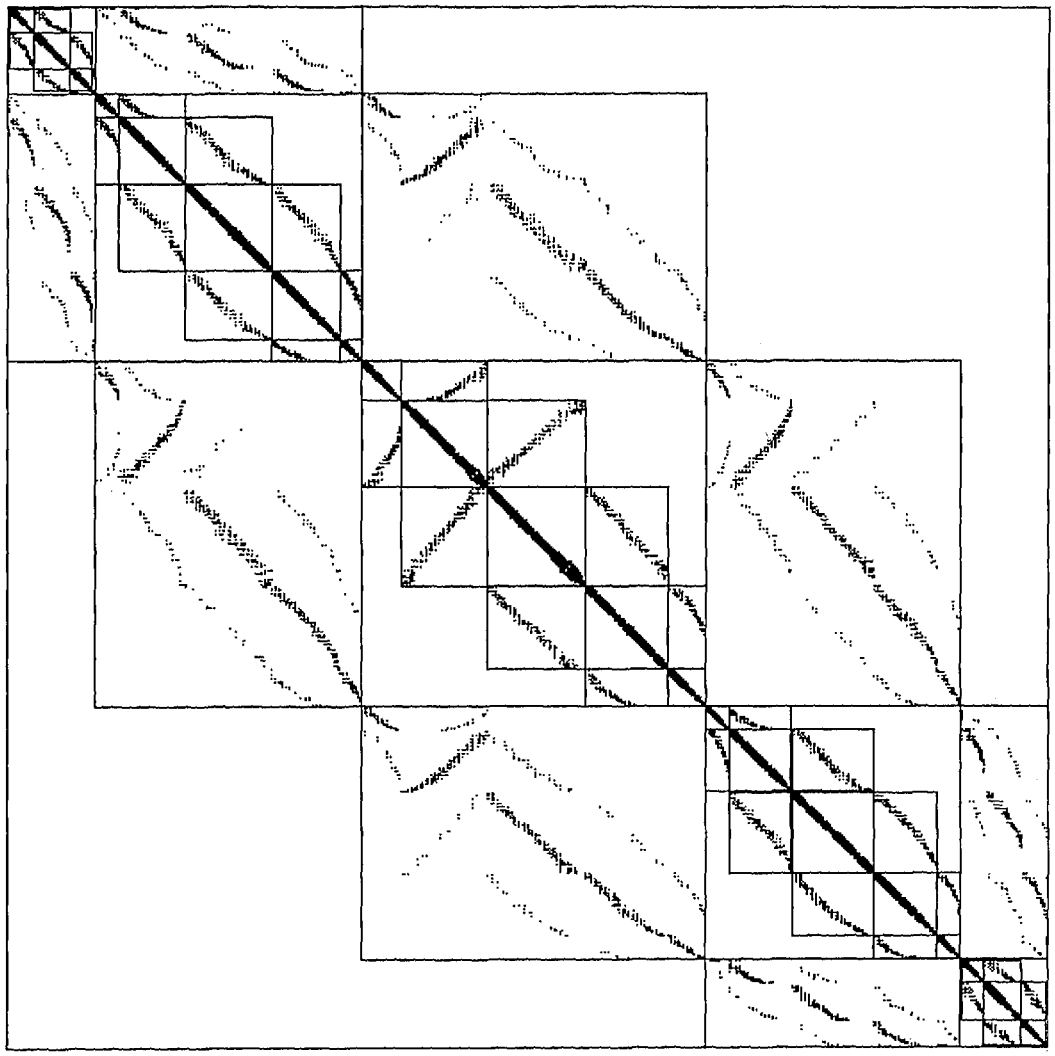
Figure 11 – Nested block tridiagonal matrix for truncated cone (black pixels represent non-zero matrix elements)

History Matching**

Develop Plan**

Figure 14: Reservoir Simulation
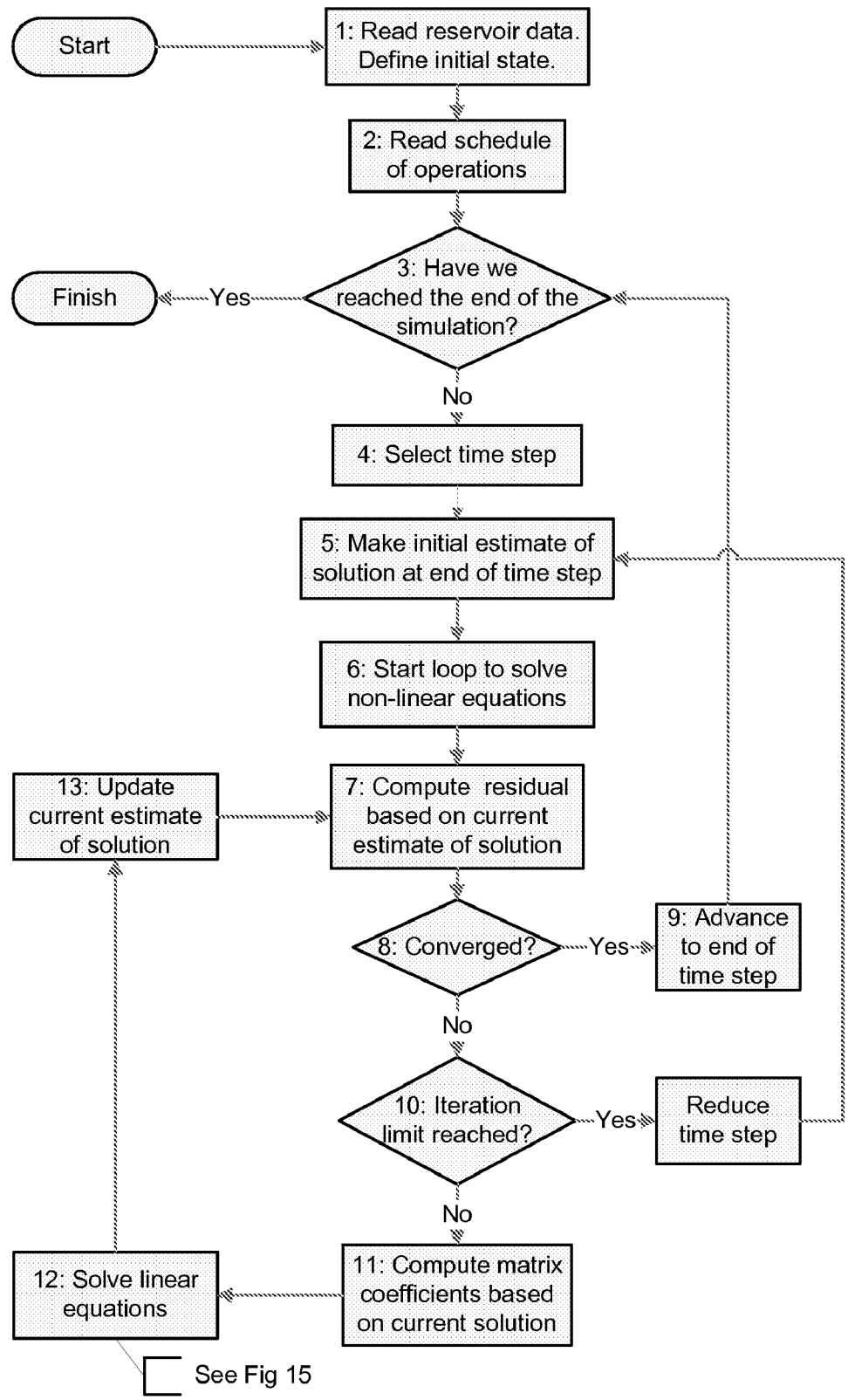

Figure 15: Solve Linear Equations
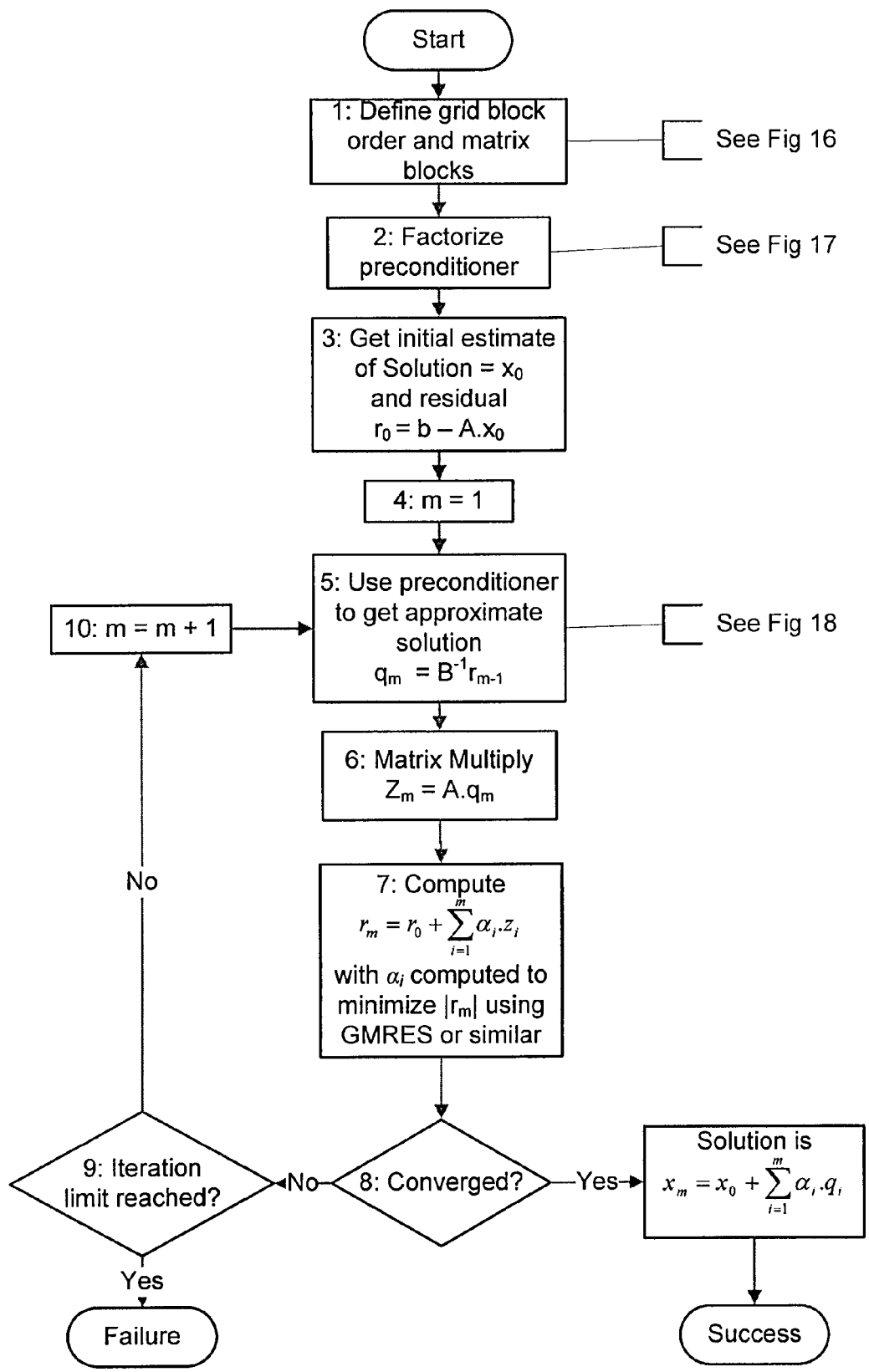

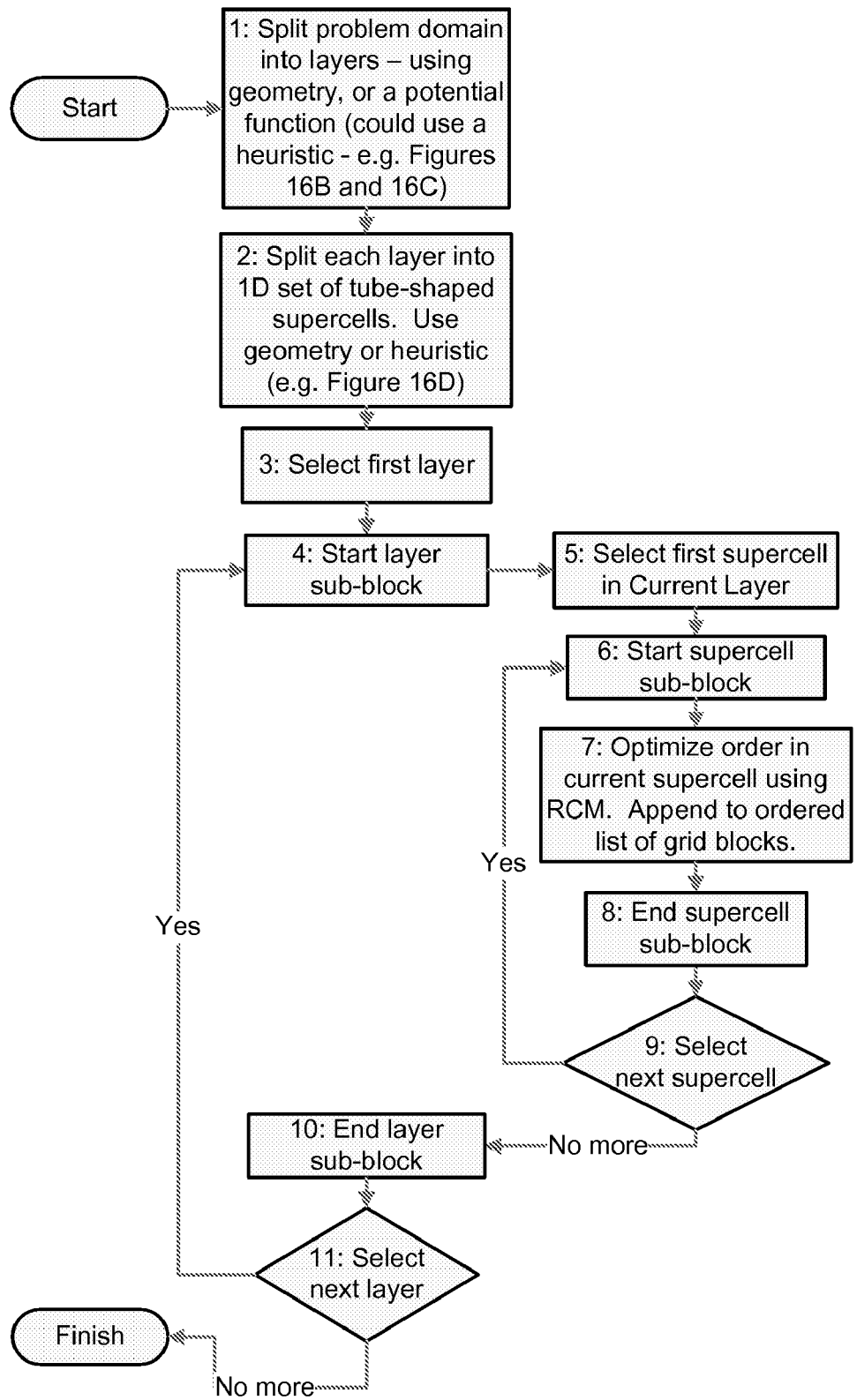
Figure 16A: Ordering for a 3D Problem Domain

Figure 16B: Heuristic Procedure for Assigning Nodes to Layers
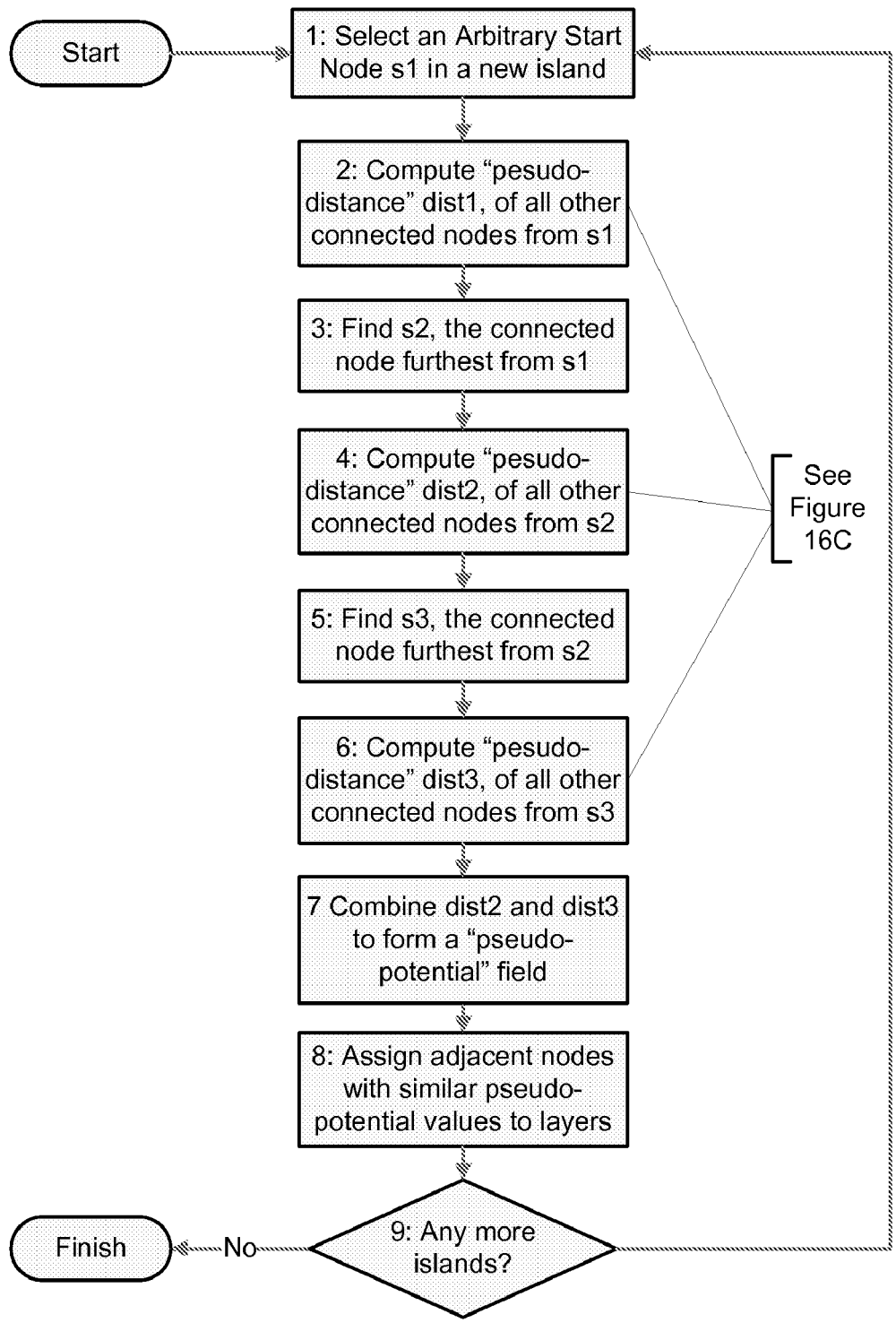

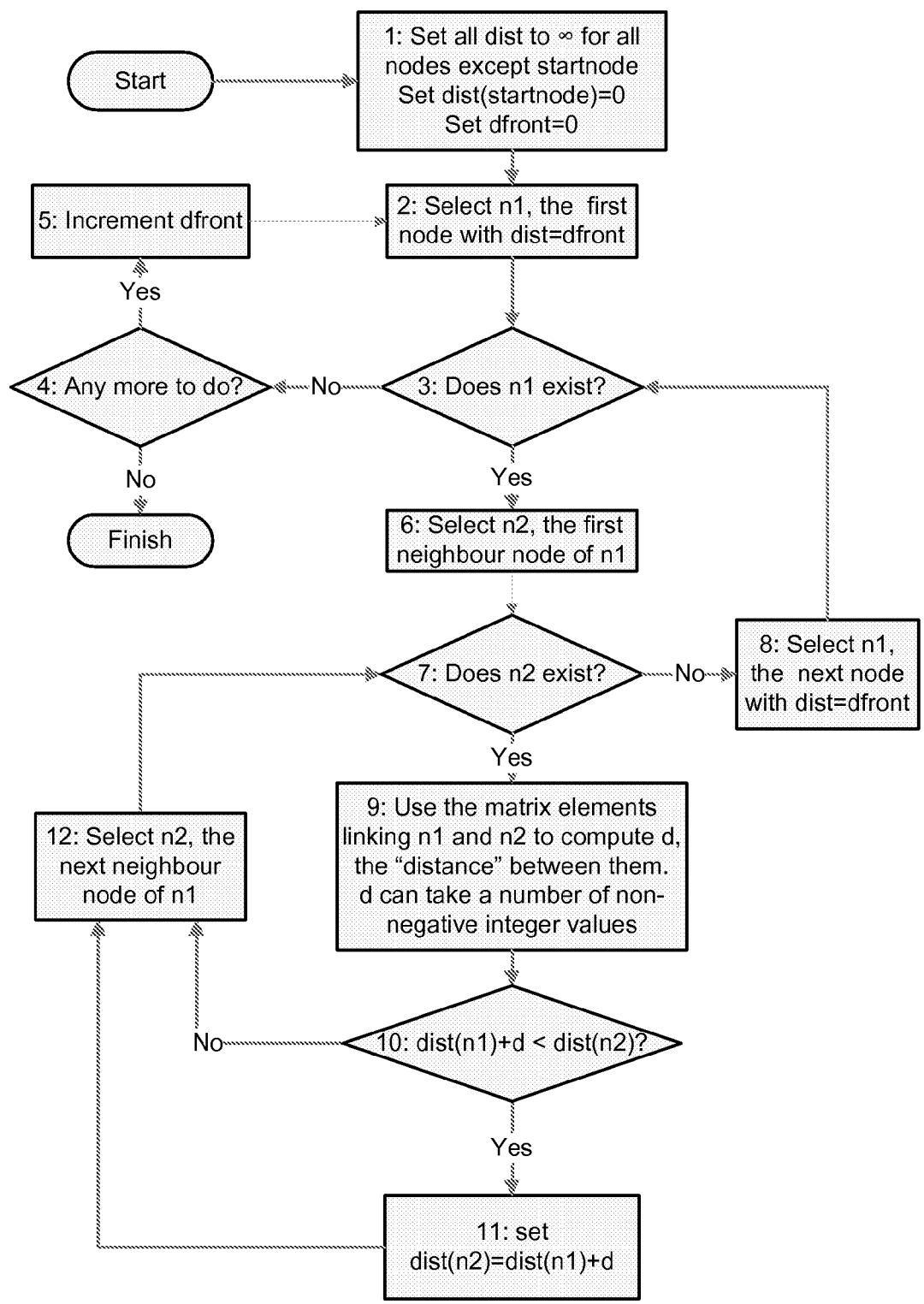
Figure 16C: Compute "Pseudo-Distance" from a start node to all other nodes

Figure 16D: Grow Super-cells in a Layer
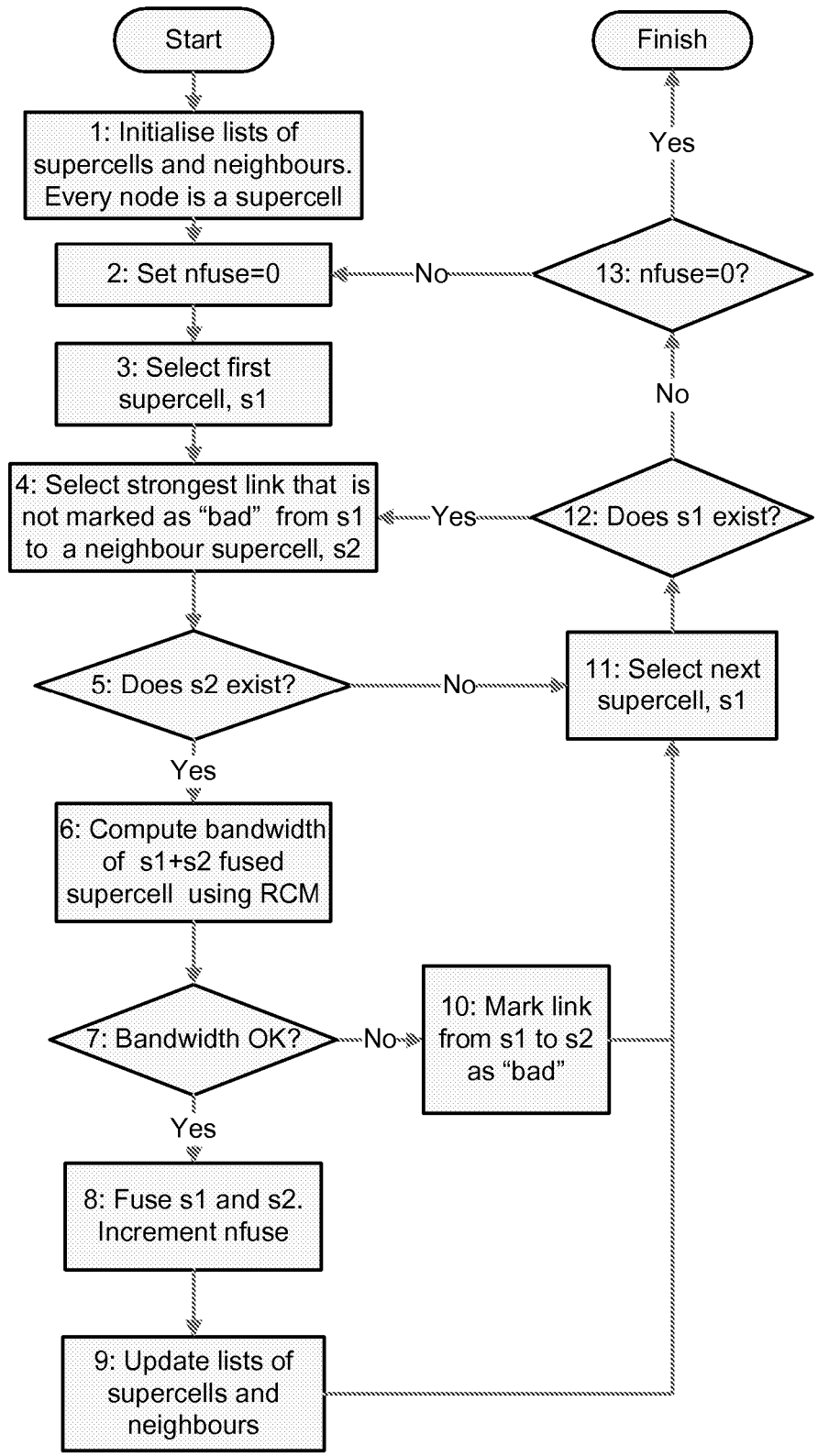

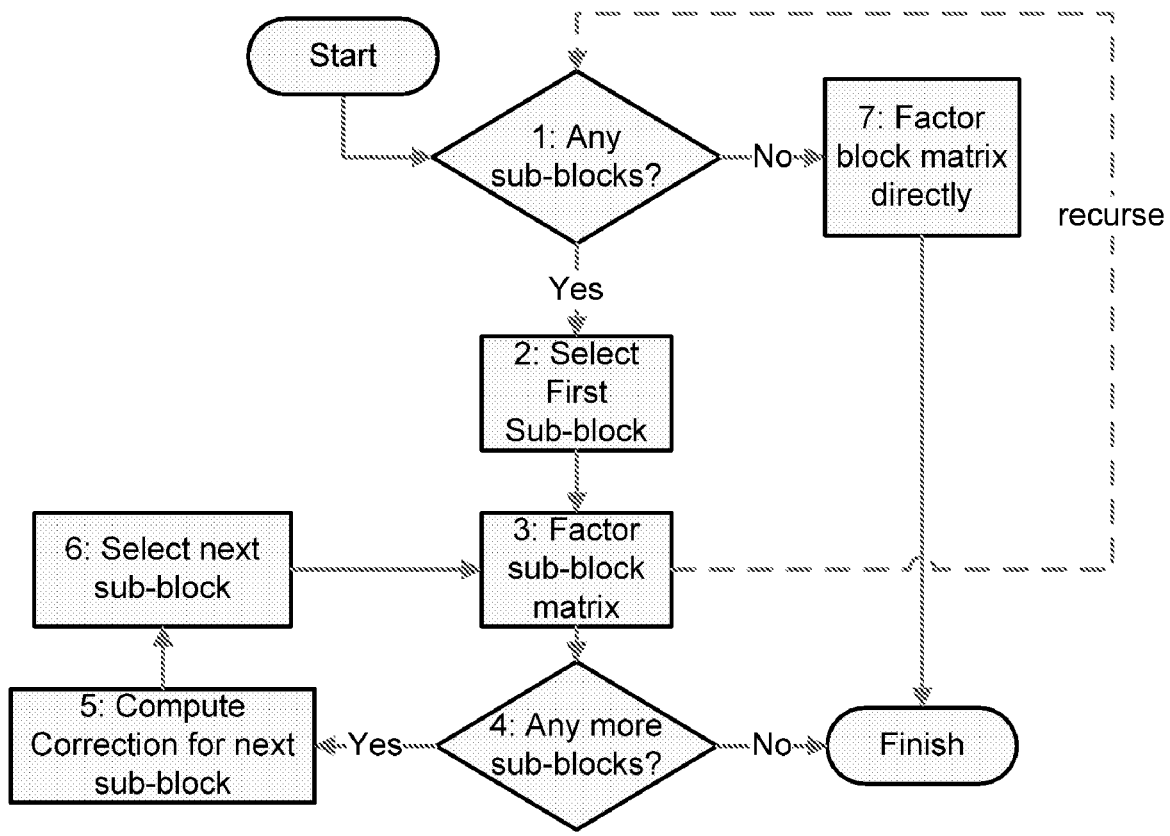
Figure 17: Factor Block Matrix (Preconditioner)

Figure 18: Solve Block Matrix (Preconditioner)
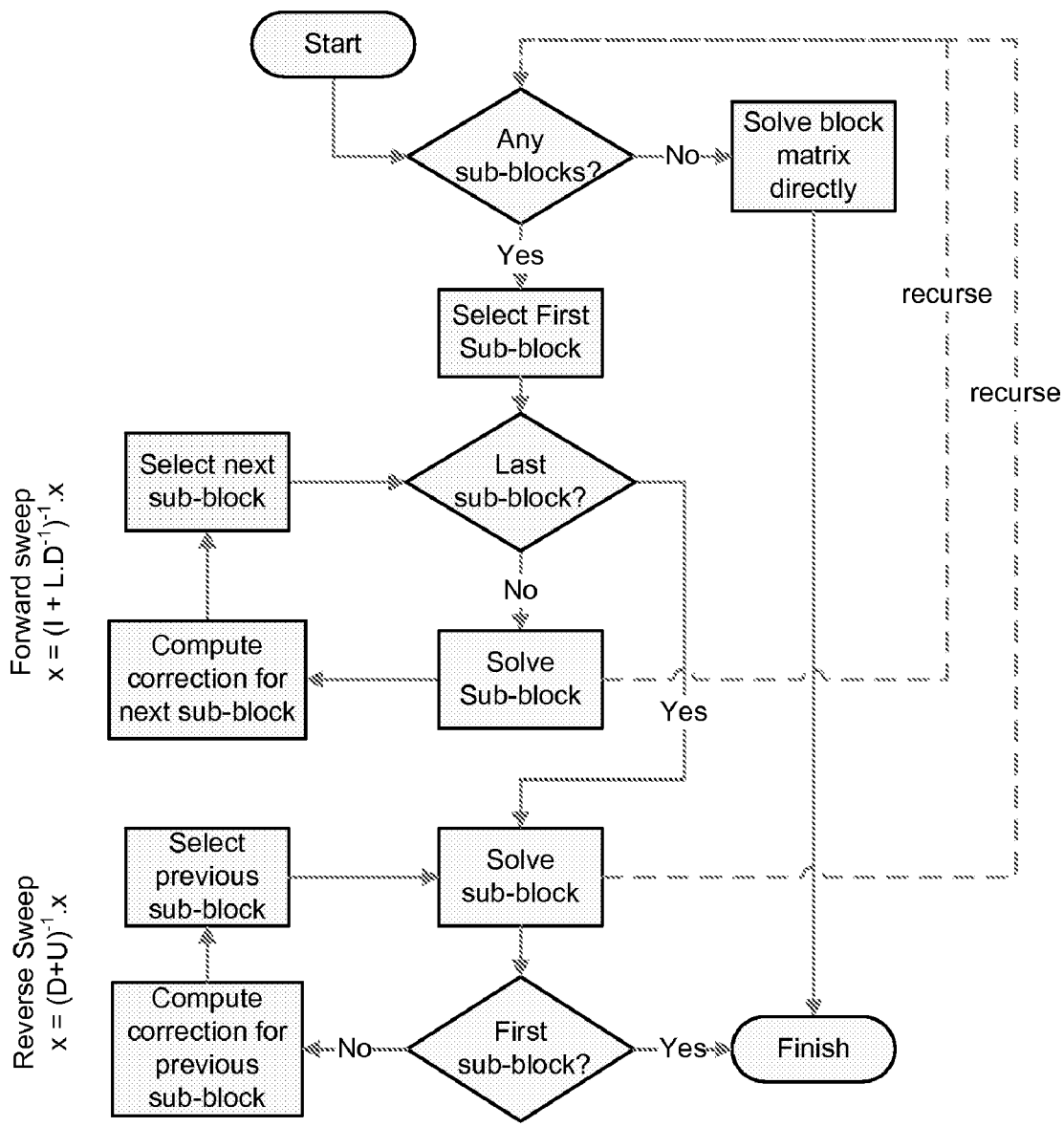

Figures 19A to 19D: A 4x4x2 Rectangular Grid – Two more GNF grid block orders

Figure 20 – A 4x4x2 Rectangular Grid – NF ordering (4x2 supergrid)
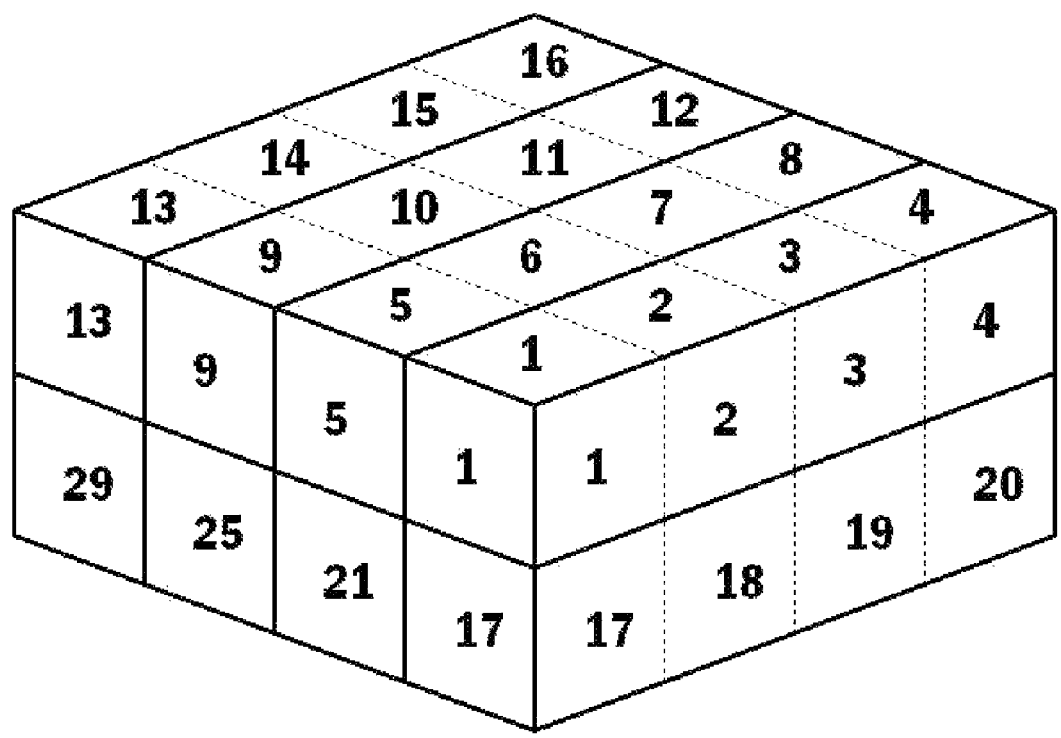

METHOD AND APPARATUS FOR ESTIMATING THE PHYSICAL STATE OF A PHYSICAL SYSTEM

TECHNICAL FIELD

The present invention relates to a method and apparatus for estimating the physical state of a physical system.

BACKGROUND

In many areas of science and engineering, complex physical problems are solved using mathematical models which are discretized over space. Various methods can be used to convert the continuous mathematical model into a discretized form, the most common being the Finite Difference, Finite Element and Finite Volume methods.

The finite volume method is commonly used in Computational Fluid Dynamics applications, and in related fields such as Oil Reservoir Simulation. This method splits a problem domain into grid blocks (cells) by superimposing a mesh or grid of some type. Fluid conservation equations are then constructed by considering the accumulation of fluids within a cell, and flow across the cell faces to neighboring cells, or to external sinks or sources, such as oil wells. Mass accumulation and flow rates depend on fluid properties such as the pressure, temperature and composition in each grid block and its neighbors. For time varying problems, the model is advanced through time by finding the values of the fluid properties that simultaneously satisfy the conservation equations in every cell for each discrete time-step.

In general these equations are non-linear, and Newton's method (or similar) is used to reduce the problem to the repeated solution of simultaneous linear equations linking all the grid blocks.

Because fluids flow only across the common faces of neighboring cells, and not between distant cells having no common face, the matrix representing the linear equation coefficients is sparse, and has a distinctive structure. For one-dimensional problems, the matrix is tridiagonal. For two- and three-dimensional problems, the matrix has a distinctive nested block tridiagonal structure (see FIGS. 1 and 2 of the accompanying drawings); the ordering of grid blocks that leads to this structure will be discussed further below.

Similar considerations apply to other space discretization methods: the end result is the requirement to solve sparse linear equations, which, with appropriate ordering of nodes, have the distinctive nested block tridiagonal structure described above.

Many common methods for iterative solution of the linear equations depend on the use of a "preconditioner"—a fast procedure for obtaining an approximate solution to the linear equations. The NF (Nested Factorization) algorithm is a preconditioner which, unlike most others, is specifically designed to approximate the nested block tridiagonal matrices which arise from space discretization. In its original form, NF can be applied to topologically rectangular meshes, but not to tetrahedral, and other more general meshes.

One practical application is in the area of oil reservoir simulation. Oil and gas are produced from porous underground rock formations containing both water and hydrocarbons. Fluids, including oil and gas are extracted through wells, and wells are also used to inject fluids, such as water, steam, carbon dioxide or chemicals with a view to improving overall production—for example by pushing oil towards a well, or making sticky oil more mobile.

Engineers use oil reservoir simulators to understand what is happening in the reservoir and to explore alternative strategies for optimizing outcomes. The results of a simulation may determine when and where new wells are drilled, and how they are controlled.

Modeling of a reservoir typically proceeds through two phases—history matching (see FIG. 12) and prediction (see FIG. 13). In the history matching phase, the past production of a field and its wells is repeatedly modeled with variations to the geological model designed to improve the match between historical fact and simulation. Once an adequate match is obtained, prediction runs can be started. These runs explore the consequences of alternative operating plans, often extending for several decades into the future. After the chosen plan is put into operation, the model will be re-run from time to time to tune the match, and refine the predictions.

The operation of a typical reservoir simulator is summarized in FIG. 14, and described below:

1. The first step is to read data describing the reservoir model defined by the reservoir engineer. Typically this comprises:—

Geological data from numerous sources, including seismic analysis, rock cores and well log analysis. The rock porosity and directional permeabilities are key variables, and often vary greatly across the reservoir. The location and characteristics of geological faults must also be specified.

Details of the computational grid; fine grids give better results, but increase computation time.

Fluid properties, such as viscosity, density and phase transition information. Relative permeabilities are used to characterize the mobility of different phases when mixtures are present. Fluid properties also vary spatially.

Sufficient information to determine the initial state of the main solution variables; these variables will include pressure, and probably the saturations of oil, water and gas. Other variables may represent the hydrocarbon composition and temperature. There may be from two up to 20 or more independent variables in each grid block. The simulator will model the changes to these variables for every grid block through a series of discrete time-steps. This solution is an n-vector, referred to here as x. n is usually the number of grid blocks multiplied by the number of solution variables per grid block.

Additional data specifying detailed control and reporting options.

2. Next the engineer's proposed schedule of operation is read in. This consists principally of the location and characteristics of all production and injection wells, and details of how they will be operated. For example a well may be opened months or years after the start of the simulation, and its production or injection rates determined partly by conditions in the reservoir or constraints of surface facilities.

3. The simulator begins to loop over time steps which will advance the simulation through the schedule of operations. When the end of the schedule is reached, the simulator produces some final summary data and halts.

4. The simulator selects a time-step by which to advance. This may be anything from a few seconds to a year or more, depending on what is required by the schedule, and by numerical considerations.

5. The simulator makes an estimate (dx) of the change in the solution variables between the start and end of the time-step. dx, like x, is an n-vector.

6. The simulator now begins a second loop to solve the non-linear equations which describe mass conservation in each grid block.
7. Calculate the residuals - which reflect the degree to which material is not conserved for each grid block. For a given grid block, the residuals are found by calculating the amount of all fluids in the cell at the beginning and end of the time step. This difference must be made up by flows from neighboring grid blocks and wells. Both quantities (fluid in place and flow in or out) depend on the solution variables (pressure, composition, temperature etc.) for the cell and its neighbors (x and x+dx).
8. If material does not balance, then the residuals are non-zero, and a solution must continue to be sought.
9. If the residuals are sufficiently close to zero, update the solution variables $$x=x+dx$$

and return to step 4

10. If the iteration has not converged, but the maximum permitted number of iterations has been reached, the current iteration is abandoned, and a solution is instead sought to a simpler problem. A shorter time step is selected, and processing returns to step 5.
11. If the non-linear equations have not converged, the simulator assembles a matrix (A) of derivatives using the current best estimate of the solution. Each matrix coefficient represents the rate of variation of a residual (local material balance error) with respect to a solution variable. The resulting matrix equation $$A.ddx=r$$

(where A is an nxn matrix, ddx is an n-vector of changes to the solution variables, and r is an n-vector of residuals) is a linearized version of the non-linear equations. The solution procedure is just an n-dimensional matrix form of Newton's method for finding the zeros of a one-dimensional function.

12. Solve the linear equation formed in step 11. This is often the most time consuming step in the procedure.
13. Update the current estimate of the change to the solution variables during the time step $$dx=dx+ddx$$

and return to step 7

Oil reservoir simulators are extremely demanding applications which constantly push the boundaries of what computers can do. Engineers have always demanded more sophisticated physics (more variables per grid block) and finer meshes (more grid blocks) both of which trends increase computational requirements. In addition, convergence of the linear and non-linear equations to solution is not a forgone conclusion. Many models devised by engineers simply don't work because the simulator cannot find a solution.

The most time consuming part of a simulation is the solution of the linear equations (step 12 above). Direct methods, such as Gaussian elimination, cannot be used because they would require far too much memory, and take far too long. Most simulators now use an iterative method based on GMRES, or a similar Krylov subspace method, with a preconditioner to accelerate convergence. Reference 1 (a list of numbered references is included at the end of the description) contains an excellent summary of these methods. The preconditioner (B) is an approximation to A chosen such that $B^{-1}.x$ can be calculated quickly for an arbitrary vector x. The choice of preconditioner is critical: with a poor choice, the iteration may be very slow, or may not converge at all. In extreme cases the simulator will fail, even with the best known solution methods.

FIG. 15 shows how a preconditioner fits into the operation of a Krylov subspace iterative solver such as GMRES (in FIG. 15, forward-references to FIGS. 16 to 18 should not be interpreted as implying that the content of FIGS. 16 to 18 relate generally to the NF method).

1. The first step is to define the ordering of the matrix variables. For some preconditioners, the order is unimportant, but for NF it is critical. This step is discussed in detail below.
2. Next the preconditioner is factored into block upper and lower factors, B=L.U. All the elements of L and U are calculated. In most practical preconditioners, including NF, L and U retain most of the sparsity of A, and most non-zeros are the same as the corresponding terms in A. In contrast, an exact factorization of A would have few non-zeros. Once this is done, the preconditioner can be applied easily to arbitrary vectors during the iteration phase starting at step 4.
3. An initial estimate of the solution ($x_0$) is generated, or supplied by the calling program. Often $x_0$ is set to 0. The initial residual ($r_0=b-Ax_0$) is calculated.
4. The iteration counter, m is set to 1.
5. The preconditioner is used to find an approximate solution to the equation $A.q_m=r_{m-1}$ $$q_m=B^{-1}.r_{m-1}$$

If B were exactly equal to A, qm would take us to the solution.

6. Use the matrix multiply routine to form the vector $z_m$ $$z_m=A.q_m$$

7. Find the scalar values $\alpha_1 \ldots \alpha_m$ which minimize the norm of $r_m$ where $$r_m = r_0 + \sum_{i=1}^{m} \alpha_i \cdot z_i$$

8. If $r_m$ is below the convergence target then exit with the solution $$x_m = x_0 + \sum_{i=1}^{m} \alpha_i \cdot q_i$$

9. If the iteration limit has been reached, then exit reporting that the method has failed
10. Increment the iteration counter, m and return to step 5.

The Nested Factorization (NF) Algorithm is a known preconditioning method which may be used to accelerate the convergence of the conjugate gradient, GMRES, OrthoMin and other similar algorithms for iterative solution of large sparse sets of linear equations. The algorithm is described in references (2) to (4), and summarized at http://www.polyhedron.co.uk/nf-Nested Factorization0htm. This original NF algorithm assumes that the matrix is formed by considering connections between neighboring blocks in a simple topologically rectangular grid.

For an $n_x$ by $n_y$ by $n_z$ grid, the banded coefficient matrix A is $$A=d+u+l+v+m+w+n$$

where
- d is the diagonal,
- u and l are the bands immediately above and below the diagonal, which connect adjacent cells within a line
- v and m are the bands $n_x$ elements away from the diagonal, which connect adjacent lines within a plane
- w and n are the bands $n_x*n_y$ elements away from the diagonal, which connect adjacent planes For example, given a 4×4×2 grid (FIG. 1), the matrix has the structure shown in FIG. 2, based on an ordering of cells as shown in FIG. 1.

This matrix can be regarded as recursively block tridiagonal. At the outermost level each block element represents a plane, or the coefficients connecting adjacent planes. Within each plane, the blocks represent lines, and coefficients connecting adjacent lines. At the innermost level, there are individual grid blocks and the connections between individual grid blocks within lines.

NF exploits this recursive structure by defining the preconditioner, B, recursively:—

|       | $B = (I + n \cdot P^{-1}) \cdot (P + w)$ | (B is block tridiagonal - block elements are planes) |
|-------|---|---|
| where | I is the unit matrix | |
| and   | $P = (I + m \cdot T^{-1}) \cdot (T + v)$ | (P is block tridiagonal - block elements are lines) |
| and   | $T = d + I + u - \text{approx}(\epsilon)$ | (T is tridiagonal) |
| and   | $\epsilon = m \cdot T^{-1} \cdot v + n \cdot P^{-1} \cdot w$ | (the uncorrected error matrix) | approx($\epsilon$) is a matrix which is computed to approximate $\epsilon$. It is usually diagonal, but could be tridiagonal. Common approximations are:— diag($\epsilon$) the diagonal elements of $\epsilon$
rowsum($\epsilon$) the diagonal matrix formed by summing the elements of $\epsilon$ in rows
colsum($\epsilon$) The diagonal matrix formed by summing the elements of $\epsilon$ in columns.

After expansion, the following is obtained:—

$$B = A + \epsilon - \text{approx}(\epsilon)$$

In summary, B is a partial L.U factorization, but unlike most other similar methods, the factors L and U are block (rather than strictly) lower and upper triangular. For the example 4×4×2 finite difference matrix, $(I+n.P^{-1})$ and $(P+w)$ are 2×2 matrices $$\begin{array}{cc} I & P_a \quad w \\ n \cdot P_a^{-1} \quad I & \quad P_b \end{array}$$

where $P_a$ and $P_b$ are themselves matrices which connect cells within the 2 planes, and n, w are diagonal matrices containing elements from A. To compute $B^{-1}.x$, where x is a vector, first sweep forward through the planes to obtain $(I+n.P^{-1})^{-1}.x$, and then back to apply $(P+w)^{-1}$. The problem is thus reduced to solving $P^{-1}.x$ for each plane, and from three dimensions to two.

For a suitable choice of P ($P=A-n-w-n.P^{-1}.w$), this factorization of A is exact. However an exact factorization is not practical for large matrices, and instead, each block element of P is approximated in the same way—with an incomplete block L.U factorization.

$$P_a = (I+m.T^{-1}).(T+v)$$

For the example matrix, $(I+m.T^{-1})$ and $(T+v)$ are 4×4 matrices $$\begin{array}{cccc} I & & & T_a \quad v_a \\ m_a T_a^{-1} & I & & \quad T_b \quad v_b \\ & m_b T_b^{-1} & I & \quad \quad T_c \quad v_c \\ & & m_c T_c^{-1} & I \quad \quad \quad T_d \end{array}$$

where $T_a$, $T_b$, $T_c$ and $T_d$ are themselves 4×4 matrices which connect cells within a line, and m, v are diagonal matrices containing elements from A. The evaluation of $P_a^{-1}.x$ proceeds in the same way as that of $B^{-1}.x$, and the problem is further reduced from 2 dimensions to 1. The solution of the one-dimensional problems, which are of the form $T_a^{-1}.x$ (where $T_a$ is tridiagonal) is then a simple matter which terminates the recursion. There are three levels of recursion because the computational grid occupies a three-dimensional space.

In fact, the NF preconditioner can be shown to be equivalent to a strictly triangular factorization, but with L and U factors that include a good subset of the fill-in bands produced by a Cholesky factorization. However the computational work and storage required by NF is much less than would be required to calculate the fill-ins. This explains why NF performs better than ILU methods.

The NF algorithm was designed around rectangular grid geometries, and the innermost loops involve the solution of tridiagonal matrices representing lines of grid blocks. In practice, NF has been extended from this simple case in a number of ways, for example:—

- Extension to coupled "multi-phase" problems with several independent variables (e.g. pressure, temperature and composition) in each grid block. In this case individual matrix elements are small (e.g. 4×4) dense matrices rather than scalars, but the algorithm is otherwise unchanged.
- Accommodation of "non-neighbor" connections that can be used to simulate some more complex geometries, such as local grid refinements
- Accommodation of "nine-point" finite difference terms (non-zero terms connecting diagonally adjacent grid blocks)
- "Multi-Color" orderings designed to allow efficient execution on parallel computers.
- Extra levels of recursion to deal with some classes of problem which can be thought of as four or five dimensional (multiple porosity models).
- Inclusion of higher order error correction terms on the l and u terms in the tridiagonal.
- Reference 5 describes a method for applying NF to 2D unstructured meshes and 3D prismatic meshes. The method retains the assumption of tridiagonal inner blocks.

In every case, the basic operation in the extended versions of NF remains as the solution of a tridiagonal matrix (or block tridiagonal in the multi-phase case) representing a strictly one-dimensional line of grid blocks. This restriction limits the application of NF in a number of ways:—

- There is limited scope for "higher order" versions which produce a more accurate preconditioner at the cost of some additional computation. In contrast, the family of ILU factorizations achieve this by allowing more "fill-in", so that the factorizations in the series ILU0, ILU1, ILU2 etc. are each more accurate than the one before.
- "Non-neighbor" connections break the method if they occur between grid-blocks in the same line. For example, in a model representing the surface of a sphere, the natural inner element is a circle rather than a line of blocks. Another example occurs in oil reservoir simulation, where a well passing through several grid blocks may introduce additional connections between non-adjacent cells.

NF cannot be used for less regular geometries, for example the tetrahedral or irregular meshes common in CFD and structural analysis.

SUMMARY

According to a first aspect of the present invention there is provided a computer-implemented method of estimating the physical state of a physical system with known physical characteristics and subject to specified boundary conditions, comprising: representing the system as a plurality of nodes arranged in N-dimensional space, where N is an integer greater than 1, each node being associated with a set of physical properties, the physical properties associated with the nodes together forming a vector x when arranged in order, such that the vector x represents the physical state of the system; receiving physical data relating to the boundary conditions and the physical characteristics of the system, and determining from the received data the relations which must be satisfied by the component elements of the vector x, the number of relations being sufficient to determine the value of all elements of x; receiving or determining an initial estimate $x_0$ of the physical properties which will satisfy the relations; and for each of a plurality of iterations, estimating the change dx in the vector x that results in all of the relations being simultaneously satisfied, and at the end of each iteration updating the current value of x according to x=x+dx; wherein estimating dx comprises: determining an error vector r, each element of r representing the extent to which one of the required relations is not satisfied for the current value of the vector x; determining a matrix A, each element of A representing an estimate of the rate of variation of an element of r with respect to changes to an element of x; and at least approximately solving the matrix equation A.dx=r to obtain dx for each iteration; wherein the method used to solve the matrix equation A.dx=r is iterative, and uses a preconditioning matrix B as an approximation to A; wherein the order of nodes to form the vector x is determined such that the matrix A has a substantially nested block tridiagonal structure, and with at least some inner blocks having non-zero elements which connect an element of r to elements of x from more than three different nodes; and wherein B is a recursively defined incomplete block L.U factorization of A, with the blocking and recursion substantially mirroring the nested block tridiagonal structure of A.

The method may comprise performing an action using the vector x.

The action may comprise outputting the vector x.

The action may comprise operating an apparatus in dependence upon the vector x.

The action may comprise operating the physical system in dependence upon the vector x.

The method may comprise representing the nodes within a structure having a plurality of supercells, the number of supercells being less than the number of nodes, each node being assigned to a supercell according to its physical location or the value of a field variable at the node, or using a heuristic method which depends on the values of matrix coefficients, and further comprising ordering the supercells according to a first scheme, and ordering nodes within each supercell according to a second scheme.

The first scheme may comprise ordering the supercells according to a conventional nested factorization method.

The first scheme may comprise ordering the supercells according to a multi-color ordering designed adapted or arranged to allow efficient execution on parallel processors.

The second scheme may comprise ordering the nodes to reduce bandwidth.

The second scheme may comprise ordering the nodes along each of the N dimensions in turn.

The second scheme may comprise ordering the nodes within each supercell using the Reverse Cuthill-McKee method.

The structure of supercells may effectively be M-dimensional, with M being an integer less than N.

It may be that M=N−1.

Where the N-dimensional space has a dominant direction, the dominant direction may be aligned substantially normal to the M-dimensional structure.

The method may comprise calculating an exact solution for each supercell, and iterating to resolve interactions between supercells.

Each supercell may be assigned an elongate group of nodes, determined geometrically or using a heuristic method which depends on the values of matrix coefficients.

Each elongate group of nodes may be formed substantially along a line. Each of at least some supercells may be arranged to have at least 2 elongate groups of nodes assigned to it, preferably at least 5 elongate groups of nodes, and more preferably at least 10 elongate groups of nodes.

The method used to solve the matrix equation A.dx=r may comprise a preconditioned Krylov subspace based iterative method.

The method used to solve the matrix equation A.dx=r may comprise a preconditioned GMRES method.

The method used to solve the matrix equation A.dx=r may comprise a preconditioned Orthomin method.

The method may comprise representing the nodes within a supergrid structure having a plurality of supercells, the number of supercells being less than the number of nodes, each node being assigned to a supercell according to its physical location or the value of a field variable at the node, or using a heuristic method which depends on the values of matrix coefficients, and the supergrid structure comprising at least one layer of nodes, wherein the preconditioner is defined by the equation B =(I+n.P−1).(P+w), or a mathematical rearrangement thereof, wherein I is the unit matrix, P is a block diagonal matrix containing elements which connect nodes within a supergrid layer, and n and w are respectively lower and upper triangular matrices which connect nodes in different supergrid layers, and wherein individual block elements of P are defined by the equation P=(I+m.T−1).(T+v), or a mathematical rearrangement thereof, wherein I is the unit matrix, T is a block diagonal matrix containing elements which connect nodes within a supercell, and m and v are respectively lower and upper triangular matrices which connect nodes in different supercells within the same supergrid layer, and wherein individual block elements of T: (a) include corresponding elements from the original matrix A, but with the possible addition of corrections which are calculated to make B approximate A as closely as possible; (b) include non-zero elements which connect at least some nodes to three or more neighboring nodes; and (c) are such that matrix equations of the form T.q=r, where q and r are vectors, can be solved directly.

The physical characteristics and initial physical state at an initial time of a dynamically varying system are specified, together with initial boundary conditions at the initial time, and wherein the vector x determined by the method represents the physical state of the system at a discrete time interval dt after the initial time.

The method may comprise using the method to update the vector x in each of a plurality of successive time intervals, with the final physical state determined for each time interval acting as the initial physical state for the next time interval, if any, and with boundary conditions optionally varying over time.

The physical system may comprise a volume containing fluids, such as an oil reservoir, with each node representing a discrete finite volume of the system, and with the discrete finite volumes together representing the entire system.

The physical system may comprise a physical structure, such as a building or a vehicle, with each node corresponding to a boundary point of one or more finite elements of the structure, or an interior point of a finite element of the structure Each physical property may comprise a measurable characteristic of the system.

The set of physical properties may comprise a measure of at least one of pressure, oil content, water content, gas content, displacement, stress, velocity, and temperature.

The physical characteristics may comprise at least one of physical dimensions, density, viscosity, permeability, porosity, elastic modulus and specific heat, and derivatives of these quantities with respect to physical properties such as pressure and temperature.

The order of nodes to form the vector x may be determined such that the matrix A has a nested block tridiagonal structure except for the presence of at least one extra non-zero element arising from local grid refinement, circular boundary conditions, short circuit links or other extensions to the method, where the number of extra non-zero elements is small relative to the total number of non-zero elements making up the matrix A, preferably less than 5 percent, more preferably less than 3 percent, and more preferably less than 1 percent.

According to a second aspect of the present invention there is provided an apparatus for estimating the physical state of a physical system with known physical characteristics and subject to specified boundary conditions, comprising: means for representing the system as a plurality of nodes arranged in N-dimensional space, where N is an integer greater than 1, each node being associated with a set of physical properties, the physical properties associated with the nodes together forming a vector x when arranged in order, such that the vector x represents the physical state of the system; means for receiving physical data relating to the boundary conditions and the physical characteristics of the system, and determining from the received data the relations which must be satisfied by the component elements of the vector x, the number of relations being sufficient to determine the value of all elements of x; means for receiving or determining an initial estimate $x_0$ of the physical properties which will satisfy the relations; and means for estimating, for each of a plurality of iterations, the change dx in the vector x that results in all of the relations being simultaneously satisfied, and at the end of each iteration updating the current value of x according to x=x+dx; wherein the means for estimating dx comprises: means for determining an error vector r, each element of r representing the extent to which one of the required relations is not satisfied for the current value of the vector x; means for determining a matrix A, each element of A representing an estimate of the rate of variation of an element of r with respect to changes to an element of x; and means for at least approximately solving the matrix equation A.dx=r to obtain dx for each iteration; wherein the method used to solve the matrix equation A.dx=r is iterative, and uses a preconditioning matrix B as an approximation to A; wherein the order of nodes to form the vector x is determined such that the matrix A has a substantially nested block tridiagonal structure, and with at least some inner blocks having non-zero elements which connect an element of r to elements of x from more than three different nodes; and wherein B is a recursively defined incomplete block L.U factorization of A, with the blocking and recursion substantially mirroring the nested block tridiagonal structure of A.

According to a third aspect of the present invention there is provided a program for controlling an apparatus to perform a method according to the first aspect of the present invention or which, when loaded into an apparatus, causes the apparatus to become apparatus according to the second aspect of the present invention.

The program may be carried on a carrier medium.

The carrier medium may be one of a storage medium and a transmission medium.

According to a fourth aspect of the present invention there is provided a storage medium containing a program according to the third aspect of the present invention.

Regarding the step of receiving or determining an initial estimate $x_0$ of the physical properties which will satisfy the relations, the final value of x is typically obtained by Newton's method starting from an initial estimate. Typically that estimate is trivial—just zero, or in the time dependent case, "unchanged".

In the term "variable" physical properties is intended to draw a distinction between state variables such as pressure, displacement and so on which are the output from the procedure, and non-variable physical characteristics, such as porosity or Young's modulus which, together with the boundary conditions, are part of the problem definition.

An embodiment of the present invention has been developed as a revised version of the Nested Factorization (NF) algorithm, and is referred to herein for convenience as "Generalized Nested Factorization" (GNF). GNF relates to a "preconditioner", an essential component of iterative methods for the solution of large sparse sets of linear equations. GNF and NF are most applicable in problems arising from spatially discretized mathematical models.

The NF algorithm is a preconditioner designed for the nested block tridiagonal matrices which arise when a topologically rectangular mesh is used. GNF extends its applicability to tetrahedral and other non-rectangular meshes, and, even on rectangular grids, provides new ways to solve previously intractable problems.

The NF preconditioner is not widely known, but has been the numerical core of Schlumberger's industry standard ECLIPSE® series of oil reservoir simulators for the past quarter century. The new GNF algorithm has proved to be significantly faster and more robust than the old version when implemented in ECLIPSE®.

NF is very efficient, but is limited to simple topologically rectangular grid structures. On these simple grids, it has repeatedly proved to be superior to the more general ILU factorization methods used elsewhere. When applied to rectangular grids, GNF has two important advantages over NF:
1. It provides a simple method trade the accuracy of the preconditioner for speed of calculation, so that previously intractable problems can be solved.
2. It provides a way to deal with certain non-neighbor connections which limit the applicability of NF
3. It provides great flexibility for ordering equations in a way that reflects the physical characteristics of the system The GNF algorithm also overcomes the constraints which prevented NF from being used in other applications, such as CFD and structural analysis, which use more complicated computational meshes.

As previously mentioned, reference 5 describes a method for applying NF to 2D unstructured meshes and 3D prismatic meshes. The method is completely different to that proposed in an embodiment of the present invention, because it retains the assumption of tridiagonal inner blocks, which is much less general in its application.

As described with reference to FIG. 15, for some preconditioners, the order is unimportant, but for NF and GNF it is critical. Also, in most practical preconditioners, including NF and GNF, L and U retain most of the sparsity of A, and most non-zeros are the same as the corresponding terms in A.

It should be noted that FIGS. 12 to 15 are equally applicable to GNF as they are to NF.

BRIEF DESCRIPTION OF THE DRAWINGS

FIG. 1 illustrates a 4×4×2 rectangular grid;

FIG. 2 illustrates a matrix structure for a 4×4×2 rectangular grid;

FIG. 3 illustrates a 4×4×2 rectangular grid with changed grid block ordering;

FIG. 4 illustrates a matrix structure for a 4×4×2 rectangular grid (revised order);

FIGS. 5A and 5C illustrate examples of "brick wall" supergrids;

FIG. 6 illustrates a supercell matrix before and after RCM re-ordering;

FIG. 7 illustrates a truncated cone with a tetrahedral mesh (side and top views);

FIG. 8 illustrates a side view showing how it can be split into layers;

FIG. 9 illustrates a top view showing how each layer can be split into "supercells";

FIG. 10 illustrates an original matrix structure for a truncated cone;

FIG. 11 illustrates a nested block tridiagonal matrix for a truncated cone;

FIG. 14 illustrates a procedure for reservoir simulation;

FIG. 15 illustrates a procedure for solving linear equations;

FIG. 16A, 16B, 16C and 16D illustrate procedures for ordering in a 3D problem domain;

FIG. 17 illustrates a procedure for factoring a block matrix (preconditioner);

FIG. 18 illustrates a procedure for solving a block matrix (preconditioner);

FIG. 20 illustrates the supercell concept as applied to the NF ordering of FIG. 1.

DETAILED DESCRIPTION

Figure 5A:
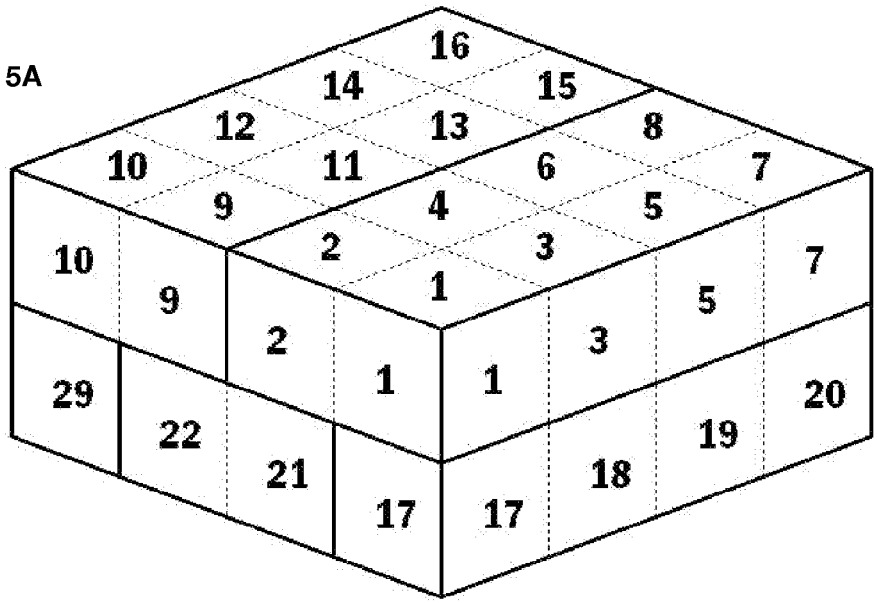

In an embodiment of the present invention, referred to herein for convenience as "Generalized Nested Factorization" or GNF, we attempt to address the above-mentioned limitations associated with NF by relaxing the requirement that the inner matrix blocks be strictly tridiagonal. In general we assume instead that there is a central band which contains all the non-zeros, and use appropriate methods for factoring and solving the band matrix. Of course, a tridiagonal is just a special case of the more general band matrix.

To exploit this new freedom, the grid-blocks are ordered differently, so that when we view its sparsity pattern, the coefficient matrix still has a nested tridiagonal structure, but the inner blocks are band matrices rather than tridiagonals. Reordering the equations does not change the solution, but in the case of GNF, it changes the approximate solution produced by the preconditioner.

GNF produces these new orders by superimposing a coarse two-dimensional supergrid over the three-dimensional problem domain (for two-dimensional problems, a one-dimensional supergrid is required). Each of the original cells is assigned to a block in the supergrid (a supercell) based on its physical location, or using a field variable such as potential. Alternatively, heuristic methods can be used to assign nodes to supercells based only on matrix coefficients. The supercells are ordered conventionally, and within each supercell, cells are reordered using the well-known "Reverse Cuthill-McKee" (RCM) method to minimize the bandwidth. The solution procedure provides an exact solution within each supercell, but iteration is required to resolve interactions between the supercells. The solution becomes more exact as the supergrid is made coarser, and in the limiting case, where there is only one supercell, GNF is actually a direct solver.

A very simple example of GNF applied to a rectangular grid can be obtained by modifying the cell numbering of the example in FIGS. 1 and 2, so that the inner matrix contains two lines instead of one. FIGS. 3 and 4 show the revised numbering and the new matrix structure. In this case the supergrid is 2×2 with each supercell containing two lines from the original grid. The supergrid partitions are illustrated in bold lines in FIG. 3. To provide a direct comparison with the original NF ordering method, if the supercell concept were applied to the original NF ordering as illustrated in FIG. 1, each supercell would contain only a single line, as illustrated in FIG. 20.

The construction of the preconditioning matrix, B is exactly as before, except that T is now a band matrix (pentadiagonal in this case).

| | $B = (I + n'' \cdot P^{-1}) \cdot (P + w'')$ | (B is block tridiagonal - block elements are planes) |
|---|---|---|
| where | I is the unit matrix | |
| and | $P = (I + m'' \cdot T^{-1}) \cdot (T + v'')$ | (P is block tridiagonal - block elements are lines) |
| and | $T = d + I + u + m' + v' + n' + w' -$ approx($\epsilon$) | (T is a band matrix) |
| and | $\epsilon = m'' \cdot T^{-1} \cdot v'' + n'' \cdot P^{-1} \cdot w'''$ | (the uncorrected error matrix) |

Here, m', v', n' and w' represent the parts of m, v n and w that fall within the central band, and m'', v'', n'' and w''' represent the parts that do not.

This procedure requires more computational work than before, but the preconditioning matrix approximates A more accurately, because error terms of the form $m'.T^{-1}.v'$ and $n'.P^{-1}.W'$ have been eliminated. As a result, the convergence of the iteration will generally be faster.

Figure 19A:
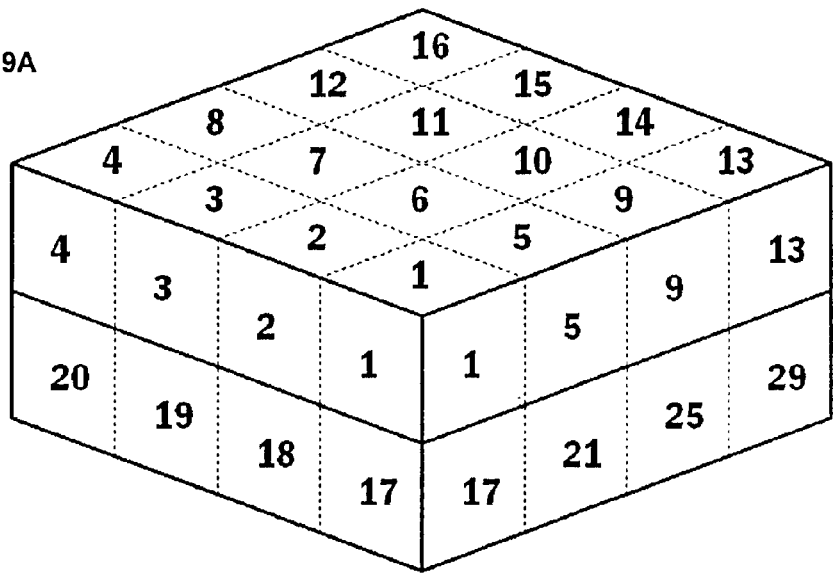
FIGS. 19A, 19B, 19C and 19D illustrate a 4×4×2 rectangular grid with two different GNF supergrids, and the corresponding matrix structures.
Figure 19B:
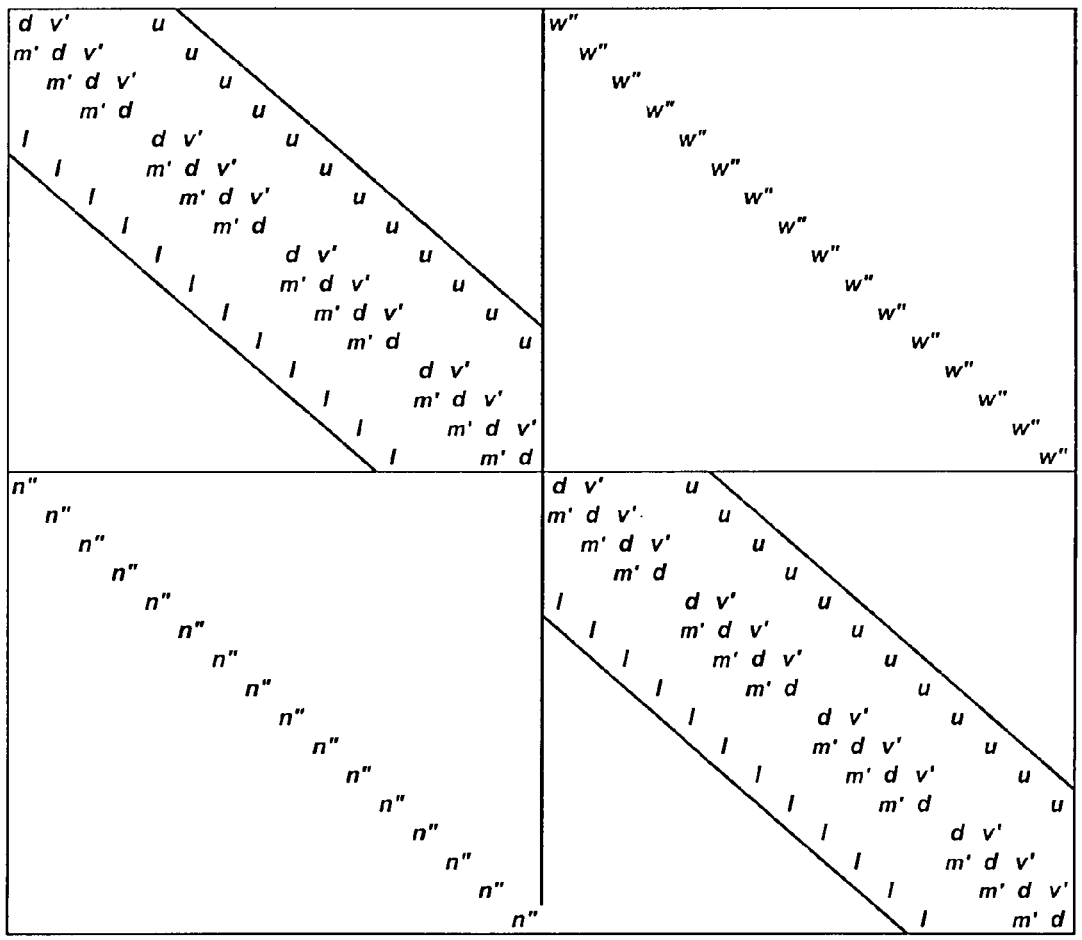
Figure 19C:
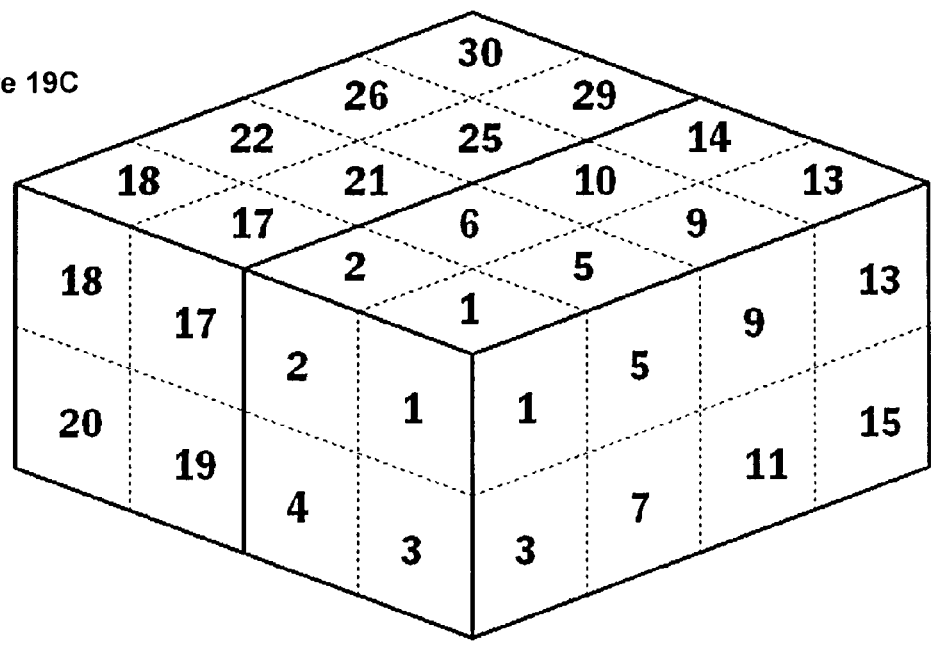
Figure 19D:
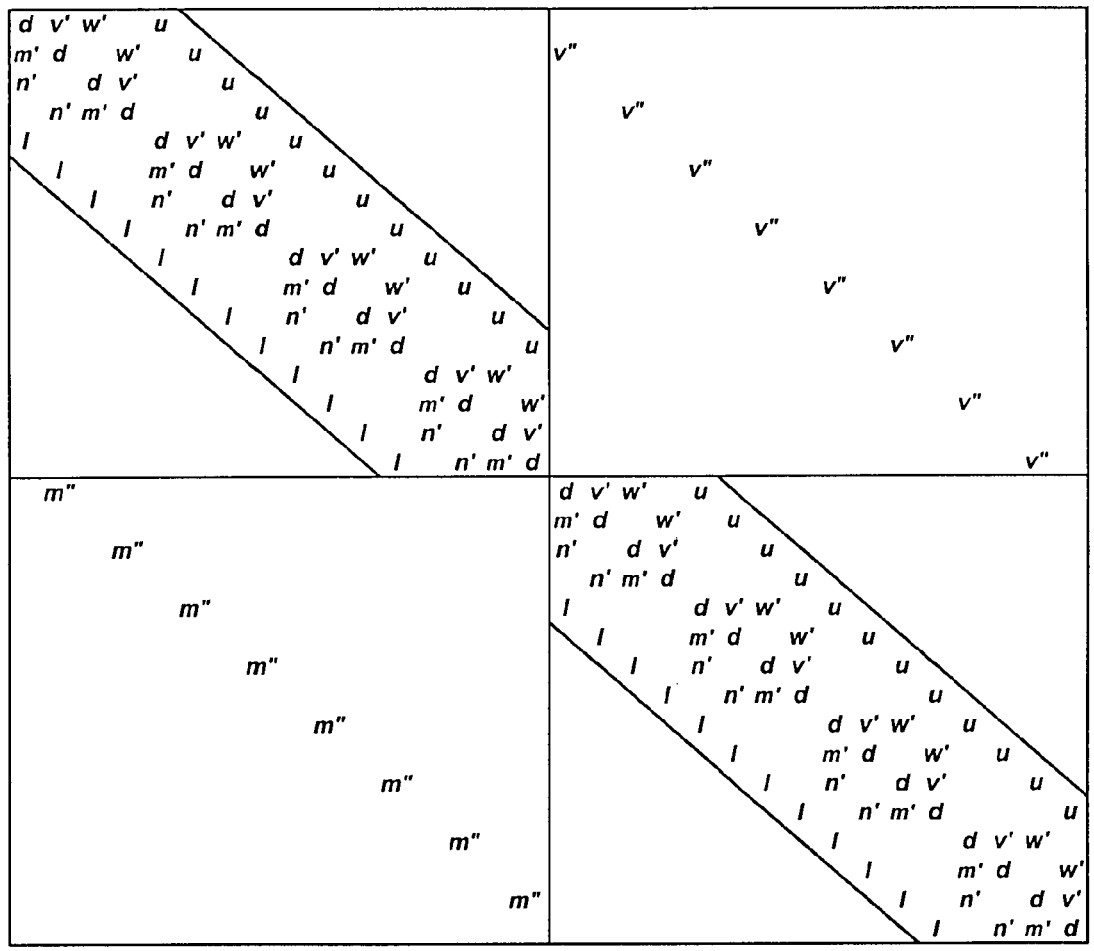

Ever more accurate approximations can be created by including more lines in the central band. In the simple 4×4×2 block case, the next stage is to include 4 lines—either a whole plane (4×4×1) at a time (see FIGS. 19A and 19B for the GNF ordering and corresponding matrix structure), or in 4×2×2 blocks (see FIGS. 19C and 19D). In both cases the number of error terms is greatly reduced.

The GNF ordering procedure will now be described, and how it differs from ordering in NF.

FIG. 16A shows the procedure used to create a GNF ordering.

1. The first step is to divide the problem domain into a one-dimensional set of layers. In the original NF algorithm, layers are single planes taken from the rectangular grid, oriented so that the strongest connections fall within the planes. NF cannot handle unstructured grids. GNF can extend this in several different ways:
   a. For rectangular grids a simple extension is just to assign two or more adjacent planes to each layer.
   b. For both rectangular and unstructured grids, the node location can be used to decide on layering. For example, a layer might contain all nodes with an x coordinate in a specified range.
   c. For both rectangular and unstructured grids, a field variable such as potential can be used to define layers. For example, a layer might contain all nodes with starting potential between specified values.
   d. For both rectangular and unstructured grids, heuristic methods can be used to construct a pseudo-potential for each node using only the matrix coefficients as input. The pseudo-potential can then be used assign nodes to layers, as described above. (see FIGS. 16B and 16C for an example of a heuristic method for defining layers)

Whichever method is used it is important that layers be oriented so that the largest matrix elements connect nodes within the same layer, and the number and size of matrix elements connecting nodes in different layers is minimized. In some cases, this alignment is easy to achieve; for example in many geological models the vertical direction is dominant, because the formation thickness is much less than its horizontal extent. Other problems may be more or less isotropic, in which case alignment is not critical.

The thickness of layers is also an important consideration. Thicker layers will generally produce a more accurate preconditioner, but increase the computer time required to factor and solve the preconditioning matrix. This is because the layer thickness helps determine the bandwidth of supercells (see below). For rectangular grids, the best balance is achieved when layers contain a small number of planes—usually between 2 and 5. For unstructured grids, the layer thickness is more difficult to quantify, but the optimum is similar. In general, the split should be uniform, so that the layers are of roughly equal thickness, but in some cases, it may be desirable to make the layers thicker around computational hot-spots.

2. Next we have to split each layer into a one-dimensional set of supercells which are the basic elements in the solution procedure. The methods used to split a layer into supercells may be geometric or heuristic. A geometric method uses the node location as the basis for assigning it to a supercell. Heuristic methods use only the matrix coefficients to perform the assignment. FIG. 16D shows an example of a heuristic method, which grows supercells by fusing fragments so that the largest matrix elements fall within supercells, but the bandwidth does not exceed specified target values. The heuristic method used to define layers (FIGS. 16B and 16C) can also be adapted to this task.

For both methods, the supercells should be oriented so that the largest matrix elements connect nodes within the same supercell. The number and size of matrix elements connecting nodes in different supercells should be minimized, most particularly for supercells in different layers.

In the original NF algorithm, the basic elements were single lines of grid blocks from a rectangular grid, and "supercells" are a generalization of that idea. In a rectangular grid, a GNF supercell could be a block including several adjacent lines. In an unstructured grid, there may be no lines as such—just groups of grid blocks which combine to form a similar cylindrical shape. In both cases, the cross sectional area of the cylinder, perpendicular to the dominant axis indicates the bandwidth of the matrix. The GNF preconditioner is most accurate when the supercells are large, but this implies a large bandwidth, and that increases the computational work required to factor and solve the preconditioner. A bandwidth of 10 or 20 (equivalent to a block of 10 or 20 adjacent lines of grid blocks in a rectangular grid) generally gives a good balance between accuracy and speed. Higher or lower bandwidths may work well in particular cases. The original NF algorithm gives a bandwidth of 1 (except where there are multiple solution variables in each grid block).

Figure 5B:
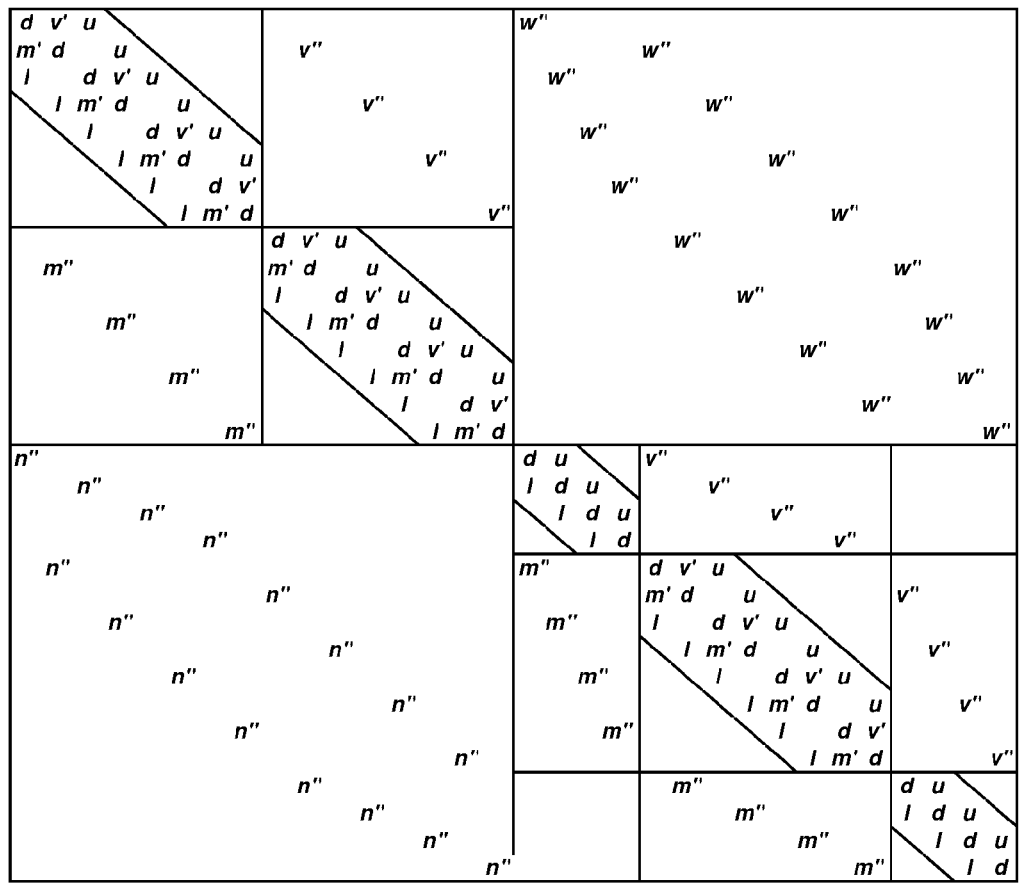
FIG. 5B illustrates the matrix structure for the FIG. 5A example.
Figure 12:
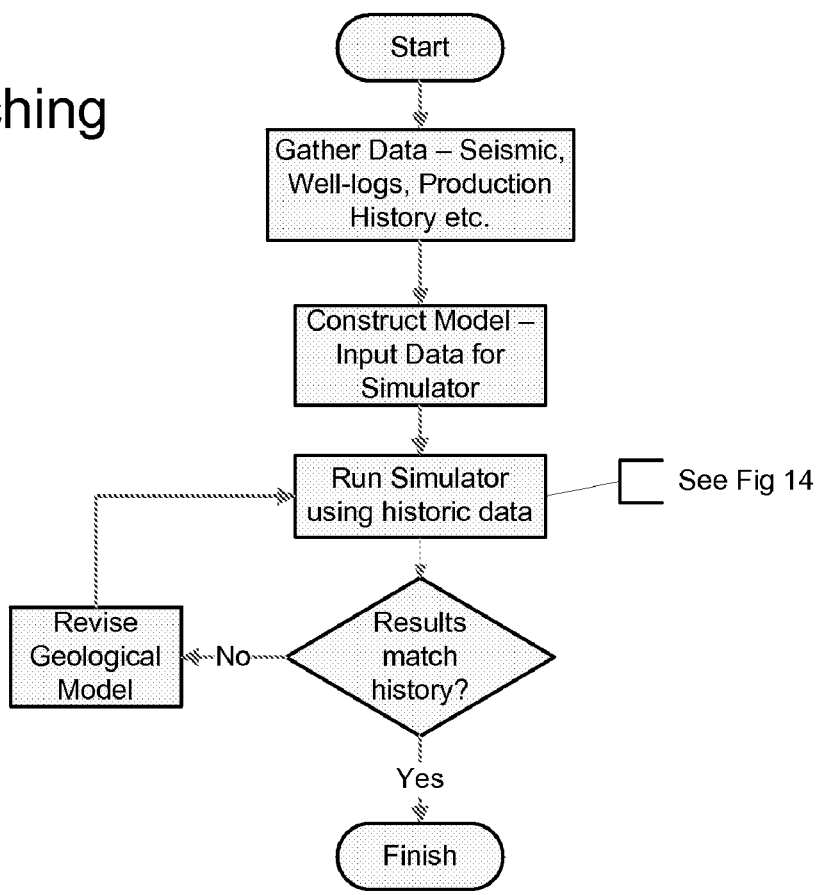
FIG. 12 illustrates a procedure for history matching.
Figure 13:
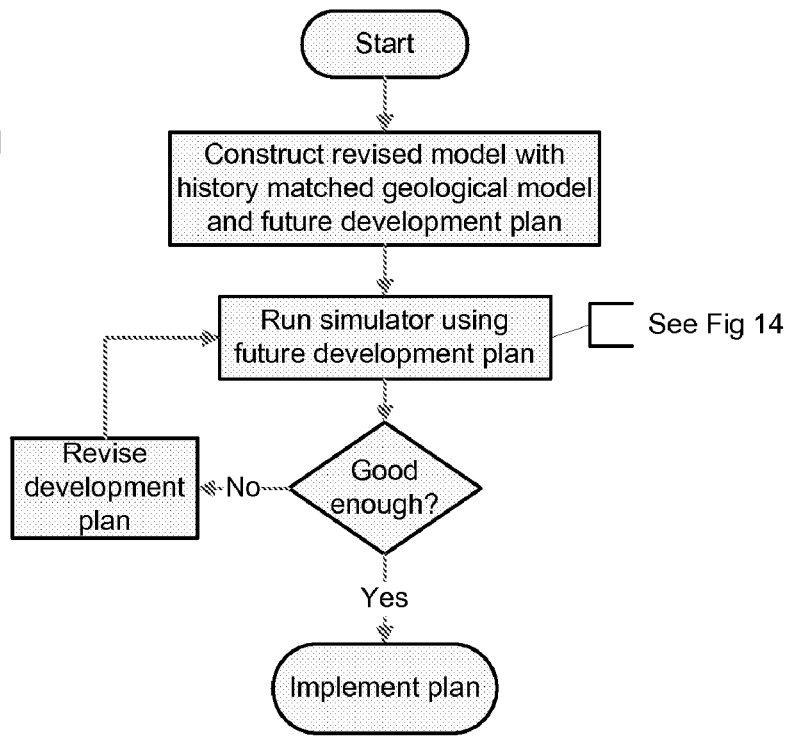
FIG. 13 illustrates a procedure for developing a plan.

There is no requirement that layers be split in the same way as their neighbors. Different splits can results in a "brick wall" supergrid—as shown in FIG. 5A for the 4×4×2 example, FIG. 5B shows the corresponding nested block tridiagonal matrix structure. FIG. 5C shows another arbitrary example.

3. Select the first layer. The first and last layers have only one neighboring layer. Other layers have two.
4. Start the layer block.
5. Select the first supercell in the current layer. The first and last supercells have only one neighboring supercell in the layer. Other supercells have two.
6. Start the supercell block
7. Add all cells in the current supercell. Use the RCM algorithm to optimize the order so that the bandwidth is minimized.
8. End the supercell block
9. If there are more supercells in this layer, select the next and go to step 7.
10. End the layer block
11. If there are more layers, then select the next and go to step 5.
12. Finish FIGS. 16B and 16C show a heuristic procedure for dividing the problem domain into layers using only the values of matrix elements. No information about node locations or field variables is required. FIG. 16B shows the overall procedure, and FIG. 16C shows a procedure that is invoked at 3 steps in FIG. 16B.

1. Select an arbitrary start node s1. If the problem domain has multiple disconnected sections (islands), then s1 must be on a previously untouched island
2. Use the procedure in FIG. 16C to compute the "pseudo distance", dist1 of all nodes on the current island from s1
3. Examine the elements of dist1 to find the node, s2 which is furthest from s1.
4. Use the procedure in FIG. 16C to compute the "pseudo distance", dist2 of all nodes on the current island from s2
5. Examine the elements of dist2 to find the node, s3 which is furthest from s2.
6. Use the procedure in FIG. 16C to compute the "pseudo distance", dist3 of all nodes on the current island from s3

7. Combine the dist2 and dist3 arrays to form a "pseudo-potential" for every node on the current island. The simplest useful combination is (dist2-dist3).
8. Assign nodes to layers according to the value of the pseudo-potential calculated in step 7. The pseudo-potential is used instead of node position, or other known field variables as a basis for splitting the problem domain into layers.
9. If there are any unprocessed islands, return to step 1.

In FIG. 16C, the steps are:
1. Set the distance for all nodes except the start-node to a very large (effectively infinite) value. For the start-node, set the distance to zero. The distance array is constrained to take non-negative integer values. Set dfront, the distance of the working front from the start-node, to zero.
2. Select the first node (n1) which is at distance dfront from the start-node. On the first iteration, n1 will be the start node.
3. If n1 exists, skip to step 6
4. If all nodes have been processed, then exit
5. Increment dfront, and return to step 2.
6. Select the first neighbor (n2) of n1. Nodes are neighbors if there is a non-zero matrix element linking them.
7. If n2 exists skip to step 9
8. Select the next node (n1) which is at distance dfront from the start-node, and return to step 3.
9. Use the value of the matrix elements for nodes n1 and n2 to compute d, the "distance" between the nodes. In general d is small if the matrix element linking n1 and n2 is large compared to other matrix elements for those nodes. d can take a number of non-negative integer values. Where the nodes are strongly coupled, d should be set to 0.
10. Check whether the distance from the start node to n2 via n1 is less than the previous best found (dist(n1)+d<dist(n2)). If not, skip to step 12.
11. Set dist(n2)=dist(n1)+d
12. Select the next neighbor (n2) of n1 and return to step 7.

Once the domain has been split into layers, heuristic methods can also be used to split each layer into an array of supercells. In general, the supercells form a mostly one-dimensional array, so that each supercell has no more than two neighbors within the layer. In addition, the nodes that are most strongly coupled fall within the same supercell, and the bandwidth of the supercell, after application of the RCM (Reversed Cuthill-Mckee) ordering procedure is below a specified limit. FIG. 16D shows a suitable procedure.
1. Initialize the lists of supercells and neighbors within the current layer. Here and elsewhere in this procedure, nodes in other layers are ignored. To start, each node is placed in a separate supercell, and the supercell neighbors are simply the node neighbors.
2. Set nfuse to zero. nfuse is the number of times two supercells have been fused in the current cycle.
3. Select the first supercell, s1.
4. Select the strongest link that is not marked as "bad" from s1 to a neighboring supercell, s2.
5. If s2 does not exist (we have eliminated all neighbors as candidates for fusion with s1), skip to step 11
6. Use the RCM (Reversed Cuthill-Mckee) ordering procedure to compute the bandwidth of the supercell that would be formed by fusing s1 and s2.
7. If the bandwidth is too great, skip to step 10.
8. Fuse s1 and s2, to form an enlarged supercell, s1. The original s2 is deleted.
9. Update the lists of supercells and their neighbors to reflect the fused supercell, and skip to step 11.
10. The bandwidth was too large: mark the link from s1 to s2 as "bad".
11. Select the next supercell, s1.
12. If s1 exists, then return to step 4.
13. No more supercells. We have completed a cycle through all supercells. Were any fused (nfuse>0)? If so, return to step 2. Otherwise, exit the procedure. In the procedures described above, the "Reversed Cuthill-Mckee" (RCM-reference 6) algorithm is used to reorder the supercell equations so that the overall bandwidth is minimized. FIG. 6 shows how RCM brings the outlying coefficients into the central band for an example which includes numerous non-neighbor connections and circular connectivity on one axis. In some simple cases with rectangular grids, RCM is not required because the supercells have a band matrix structure before the application of any re-ordering.

These procedures also assume that the supercells will have a band structure, and that a band solver will be used to solve the supercell equations directly. Band solvers are very efficient if the bandwidth is small (up to about 100). If the bandwidth is larger, it's better to use general purpose direct solvers for the inner block, and in this case GNF becomes a sort of hybrid direct/iterative method.

FIGS. 7 to 11 show the application of the GNF ordering procedure to a more complex space filling mesh, using a tetrahedral grid as an example. FIG. 7 shows side and top views of the object being modeled, complete with the computational mesh. The object might represent a building or a structural component of some sort. FIG. 8 shows how it can be split into layers, and FIG. 9 shows how each layer is split into supercells. In this case the supergrid is a 5×5 rectangular grid, and two of the supercells are empty. GNF solves the equations in each of the 23 remaining supercells directly, using a band solver, and resolves interactions between the supercells using a nested block ILU iteration.

FIG. 10 shows the matrix structure before application of the GNF reordering. The matrix clearly has some structure related to the way the gridding algorithm works, but the nested tridiagonal form required for GNF is not apparent. FIG. 11 shows the matrix after GNF ordering, with boxes added to emphasize the nested tridiagonal structure. The banded matrices for the 23 supercells can be seen on the diagonal (some are very small). The blocks immediately above and below the diagonal represent the links between adjacent supercells in a supergrid layer, and the bigger blocks above and below that represent the links between the 5 layers. The GNF factorization procedure is used to pre-calculate the terms in the block LU factorization of the preconditioning matrix so that it can be applied repeatedly during the iteration. The procedure is recursive. The factorization of the full matrix depends on the existence of a procedure to factorize sub-blocks. A sub-block is a block diagonal element representing all the connections within a single supergrid layer, or, at the deepest level of recursion, all the connections within a single supercell. However the procedure for a sub-block is in fact the same as the procedure to factorize the full matrix. The recursion is terminated when the sub-blocks are small enough to be factorized directly (i.e. the sub-block contains a supercell). FIG. 17 is flow diagram of the procedure.
1. Does this block have sub-blocks? If not skip to step 7.
2. Select the first sub-block
3. Factorize the sub-block (recurse to step 1)
4. If there are no more sub-blocks, then skip to step 8
5. If there are more sub-blocks, then calculate a correction to the next sub-block using the previously factorized sub-blocks. The correction usually takes the form of a diagonal matrix which is added to the diagonal of the next sub-block.

The correction is of the form approx($m.T^{-1}.v$) where m and v are the block lower and upper matrix terms connecting current sub-block to the next. T is the current sub-block—which we have just factorized. In a standard NF version of this procedure, T would be a tridiagonal matrix, but in GNF, it is a banded matrix, or, in fact, any matrix. The approx function is commonly replaced by diag, rowsum or colsum, as defined below diag($\epsilon$) the diagonal elements of $\epsilon$
rowsum($\epsilon$) the diagonal matrix formed by summing the elements of $\epsilon$ in rows
colsum($\epsilon$) the diagonal matrix formed by summing the elements of $\epsilon$ in columns.

6. Select the next sub-block and return to step 3
7. Factorize the block directly. If this were NF rather than GNF, this step would be "Factorize the tridiagonal matrix in the current block directly".
8. Finish. If we have recursed, then return to the previous recursion level.

The GNF solution procedure computes $q = B^{-1}.r$ where B is the GNF approximation to the coefficient matrix A, and q and r are vectors.

| | | |
|---|---|---|
| | $B = (I + n \cdot P^{-1}) \cdot (P + w)$ | (B is block tridiagonal - block elements are supergrid layers) |
| where | I is the unit matrix | |
| and | $P = (I + m \cdot T^{-1}) \cdot (T + v)$ | (P is block tridiagonal - block elements are supercells) |
| and | $T = d + I + u - \text{approx}(\epsilon)$ | (T is a band or other matrix) |
| and | $\epsilon = m \cdot T^{-1} \cdot v + n \cdot P^{-1} \cdot w$ | (the uncorrected error matrix) |

Here, I and u are now the matrix coefficients connecting cells in the same supercell, m and v connect cells in different supercells, but in the same supergrid layer, and n and w connect cells in different supergrid layers. Many of the terms which would, in the NF preconditioner, have been in the m, v, n and w matrices are now included in l and u. For example, in FIGS. 4, 5B, 19B and 19D, the terms labelled m', v', n' and w' would be part of l and u in this revised notation, because they connect cells within the same supercell. As a result, there are many fewer terms in the error matrix, $\epsilon$, and the GNF preconditioner is more accurate.

The procedure consists of two stages, a forward sweep to calculate $s = (I + m.P^{-1})^{-1}.r$ and a backward sweep to compute $q = (P + w)^{-1}.s$ where s is an intermediate vector. However this procedure, like factorization, is recursive, and smaller sub-block matrices are solved using the same procedure during both the forward and backward sweeps. The recursion terminates when the sub-block matrices are small enough to be solved directly.

FIG. 18 is a flowchart of the procedure for solving a block matrix:

1. Does this block have sub-blocks? If not skip to step 11
2. Select the first sub-block
3. If this is the last sub-block, skip to step 7
4. Solve the sub-block (recurse to step 1)
5. Compute a correction for the solution in the next sub-block. The correction uses the just-solved data from the current sub-block, and is of the form
    m.s
    where m is the lower block matrix connecting the current and next sub-blocks and s is the solution obtained at step 4.
6. Select the next sub-block and return to step 3
7. Solve the sub-block (recurse to step 1)
8. If this is the first sub-block then skip to step 12
9. Compute a correction for the solution in the previous sub-block. The correction uses the just-solved data from the current sub-block, and is of the form
    v.q
    where v is the upper block matrix connecting the current and previous sub-blocks and q is the solution obtained at step 7.
10. Select the previous sub-block and return to step 7
11. Solve the block matrix directly. If this were NF rather than GNF, this step would be "Solve the tridiagonal matrix in the current block directly".
12. Finish. If we have recursed, then return to the previous recursion level.

It should be noted that many of the extensions to the original NF algorithm are equally applicable to GNF. For example:—

Extension to coupled "multi-phase" problems with several independent variables (e.g. pressure, temperature and composition) in each grid block. In this case individual matrix elements are small (e.g. 4×4) dense matrices rather than scalars, but the algorithm is otherwise unchanged.

Accommodation of "non-neighbor" connections that can be used to simulate some more complex geometries, such as local grid refinements Accommodation of "nine-point" finite difference terms (non-zero terms connecting diagonally adjacent grid blocks)

"Multi-Color" orderings designed to allow efficient execution on parallel computers.

Extra levels of recursion to deal with some classes of problem which can be thought of as 4 or 5 dimensional (multiple porosity models).

Inclusion of higher order error correction terms in the band matrix.

The following summaries at least some of the areas in which GNF differs from the prior art:—

The observation that the central blocks (supercells) in Nested Factorization do not have to be tridiagonal (or in the multi-phase case, block tridiagonal)—they can be band matrices, or indeed any other matrices.

The observation that it is useful to reorder the grid blocks so that the supercells have increased bandwidth, and represent not just one, but several lines.

The observation that a supergrid with a rectangular or "brick-wall" structure can be used to generate suitable orderings for GNF even if the underlying mesh is unstructured.

This extension of the method allows a wide variety of more accurate factorizations to be used. It also allows computational effort to be concentrated in areas which are numerically difficult.

The extension allows Nested Factorization to be used for general space filling mesh structures, and not just rectangular grids. Previously this was not thought to be practical. Tetrahedral and other mesh grids are commonly used in CFD, structural analysis and other problem domains.

The use of RCM to reorder the elements in supercells minimizes the bandwidth, and allows the algorithm to deal with complex geometries.

It should be noted that, in the literature, there are many references to "block methods", but, as noted in reference 7, that term has a variety of different meanings:—

In some cases, blocking refers to the reordering of computations in a scalar algorithm to make better use of cached data. The revised version is mathematically unchanged, but may execute more quickly on modern computers. Most references to "block methods" in discussion of BLAS, LAPACK and many other publicly accessible libraries are to this type of method.

Many algorithms which apply to normal sparse matrices may also be applied where individual elements are not single scalars, but small dense matrices. Such cases may arise when there are several independent variables in each grid block (e.g. pressure, temperature, composition etc.). Both NF and GNF can be used in this way.

Both NF and GNF also use blocking on larger scale subsets of the matrix—for example sections representing entire planes in a rectangular grid. In these cases, the block matrices are sparse.

Although an embodiment of the present invention has been described above particularly in relation to oil reservoir simulation, it will be appreciated that the present invention will find practical application in many other related areas, for example including but not restricted to the following:—

Computational Fluid Dynamics (CFD). CFD programs are used for problems involving moving fluids (liquids and gases)—particularly fluids moving around solid objects, such as vehicles, pumps, buildings, chemical apparatus or ventilation systems. The common feature of CFD programs is that they deal with the solution of the Navier-Stokes equations. However they may also deal with other issues. In this sense, a reservoir simulator is just a specialized CFD program: it deals with the Navier Stokes equations, and in addition with multi-phase flow, convection and diffusion, chemical changes, heat transfer, etc.

So far as numerical methods go, there is naturally a large overlap between CFD and reservoir simulation. Much of FIG. 14 and all of FIG. 15 could apply to non-oil CFD problems. CFD programs discretize the problem domain—often using the finite element or finite volume method—and this leads to the need to solve large sparse linear equations. CFD programs often use generalized meshes, rather than the rectangular grids common in reservoir simulation, but because the mesh is two or three dimensional, the matrix can be cast in the nested block tridiagonal structure that GNF approximates. Many current CFD programs use Krylov subspace methods similar to those used in reservoir simulators, but NF is not much used outside reservoir simulators, probably because it does not deal with generalized meshes.

Ground-water modelling is quite similar to oil reservoir simulation, but involves water rather than hydrocarbons. Salinity and/or chemical impurities may also be variables, and the model may also deal with ground subsidence, land drainage and irrigation. However as with an oil reservoir simulator, the flow domain is discretized using a rectangular or other mesh, which leads to nested block tridiagonal matrices of the type which can be approximated effectively by GNF.

Structural Analysis deals with solid artifacts, such as buildings, vehicles and mechanical components, and the usual goal is to assess the ability to withstand loads. The methods used to solve the problem are quite similar to those used in CFD. The structural system being studied is discretized—modeled by a set of finite elements interconnected at points called nodes. Each element has physical properties such as thickness, density, elasticity etc., and may be one, two or three dimensional. Typical 3D elements are tetrahedral or hexahedral, with nodes placed at vertices, and possibly in the element faces. The elements are interconnected only at the exterior nodes, and the program solved for various physical indicators, such as vector displacements at each node. Smaller elements are used to produce a more accurate model around critical parts of the structure, and unstructured meshes are the norm.

As before, this leads to a matrix which, with appropriate ordering of the variables, has a nested block tridiagonal structure which is amenable to approximation using GNF.

Weather Forecasting and Climate Modeling Programs can, like reservoir simulators, be regarded as specialized CFD applications. Different models use different methods to solve the mathematical equations which model weather and climate dynamics. Some, including many regional models used for detailed short-term forecasts, use a finite difference method to discretize a three dimensional section of the atmosphere. This leads to a matrix which can be cast in the nested block tridiagonal form that GNF approximates. Global models may have circular boundary conditions, which have an impact on matrix structure but with appropriate re-ordering (see RCM below) this is not a problem for GNF.

The reader is referred to the following documents at least some of which are referenced above by number:

(1) Saad, Yousef (2003) Iterative Methods for Sparse Linear Systems, Second Edition, published by SIAM, ISBN 0-89871-534-2
(2) Appleyard J. R., Cheshire I. M., and Pollard R. K. (1981) "Special techniques for fully-implicit simulators." In Proc. European Symposium on Enhanced Oil Recovery Bournemouth, UK, pages 395-408
(3) Appleyard J. R. and Cheshire I. M. "Nested factorization." In Seventh SPE Symposium on Reservoir Simulation, pages 315-324, 1983. paper number 12264.
(4) Parallel computing—"Using ECLIPSE Parallel"—White Paper (2003) www.sis.slb.com/media/about/whitepaper-parallelcomputing.pdf
(5) Kuznetsova, N. N. et al, (2007) "The Family of Nested Factorizations", Russ J Numer. Anal. Math. Modeling, Vol. 22,. No. 4 pp 393-412
(6) George A. (1971) "Computer Implementation of the Finite Element Method", Tech Rep STAN-CS-208, Department of Computer Science, Stanford University, Stanford, Calif.
(7) Demmel, James W, Higham, Nicholas J and Schreiber, Robert S (1992), "Block LU Factorization" available at ftp.netlib.org/lapack/lawns/lawn40.ps It will be appreciated that operation of one or more of the above-described components can be controlled by a program operating on a device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

The invention claimed is:

1. A computer-implemented method of estimating the physical state of a fluid reservoir with known physical characteristics and subject to specified boundary conditions, comprising a processor carrying out the steps of:

representing the fluid reservoir as a plurality of nodes arranged in N-dimensional space, where N is an integer greater than 1, each node representing a discrete finite volume of the fluid reservoir and being associated with a set of physical properties, the physical properties associated with the nodes together forming a vector x when arranged in order, with the vector x representing the physical state of the fluid reservoir, and where the discrete finite volumes together represent the entire fluid reservoir;

receiving physical data relating to the boundary conditions and the physical characteristics of the fluid reservoir, and determining from the received data the relations which must be satisfied by the component elements of the vector x, the number of relations being sufficient to determine the value of all elements of x;

receiving an initial estimate $x_0$ of the physical properties which will satisfy the relations; and for each of a plurality of iterations, estimating the change dx in the vector x that results in all of the relations being simultaneously satisfied, and at the end of each iteration updating the current value of x according to x=x+dx;

wherein estimating dx comprises:

determining an error vector r, each element of r representing the extent to which one of the required relations is not satisfied for the current value of the vector x;

determining a matrix A, each element of A representing an estimate of the rate of variation of an element of r with respect to changes to an element of x;

and at least approximately solving the matrix equation A.dx=r to obtain dx for each iteration;

wherein the method used to solve the matrix equation A.dx=r is iterative, and uses a preconditioning matrix B as an approximation to A;

wherein the order of nodes to form the vector x provides the matrix A with a substantially nested block tridiagonal structure, with at least some inner blocks having non-zero elements which connect an element of r to elements of x from more than three different nodes;

wherein B is a recursively defined incomplete block L.U factorization of A, with the blocking and recursion substantially mirroring the nested block tridiagonal structure of A; and wherein the set of physical properties comprises a measure of at least one of pressure, oil content, water content, gas content, displacement, stress, velocity, and temperature, or combinations involving or derived therefrom.

2. A computer-implemented method as claimed in claim 1, further comprising performing an action using the vector x.

3. A computer-implemented method as claimed in claim 2, wherein the action comprises outputting the vector x.

4. A computer-implemented method as claimed in claim 2, wherein the action comprises operating an apparatus in dependence upon the vector x.

5. A computer-implemented method as claimed in claim 2, wherein the action comprises operating the fluid reservoir in dependence upon the vector x.

6. A computer-implemented method as claimed in claim 1, comprising representing the nodes within a structure having a plurality of supercells, the number of supercells being less than the number of nodes, each node being assigned to a supercell according to its physical location or the value of a field variable at the node, or by using a heuristic method which depends on the values of matrix coefficients, and further comprising ordering the supercells according to a first scheme, and ordering nodes within each supercell according to a second scheme.

7. A computer-implemented method as claimed in claim 6, wherein the first scheme comprises ordering the supercells according to a conventional nested factorization method.

8. A computer-implemented method as claimed in claim 6, wherein the first scheme comprises ordering the supercells according to a multi-colour ordering defined by a generalized chequerboard or "greedy multi-colouring" or similar algorithm that allows many supercells to be processed simultaneously on parallel processors.

9. A computer-implemented method as claimed in claim 6, wherein the second scheme comprises ordering the nodes to reduce bandwidth using the Reverse Cuthill McKee or a similar algorithm.

10. A computer-implemented method as claimed in claim 6, wherein the second scheme comprises ordering the nodes along each of the N dimensions in turn.

11. A computer-implemented method as claimed in claim 6, wherein the second scheme comprises ordering the nodes within each supercell using the Reverse Cuthill-McKee method.

12. A computer-implemented method as claimed in claim 6, wherein each supercell comprises cells which are connected in M dimensions, where M is an integer less than N.

13. A computer-implemented method as claimed in claim 12, wherein M=N−1.

14. A computer-implemented method as claimed in claim 12, wherein, where the N-dimensional space has a dominant direction, the dominant direction is aligned substantially normal to the M-dimensional structure.

15. A computer-implemented method as claimed in claim 6, comprising calculating an exact solution for each supercell, and iterating to resolve interactions between supercells using a Krylov subspace or similar method.

16. A computer-implemented method as claimed in claim 6, wherein each supercell is assigned an elongate group of nodes, determined geometrically or by using a heuristic method which depends on the values of matrix coefficients.

17. A computer-implemented method as claimed in claim 16, wherein each elongate group of nodes is formed substantially along a line.

18. A computer-implemented method as claimed in claim 6, wherein each of at least some supercells is arranged to have at least 2 elongate groups of nodes assigned to it, preferably at least 5 elongate groups of nodes, and more preferably at least 10 elongate groups of nodes.

19. A computer-implemented method as claimed in claim 1, wherein the method used to solve the matrix equation A.dx=r comprises a preconditioned Krylov subspace based iterative method.

20. A computer-implemented method as claimed in claim 19, wherein the method used to solve the matrix equation A.dx=r comprises a preconditioned GMRES method.

21. A computer-implemented method as claimed in claim 19, wherein the method used to solve the matrix equation A.dx=r comprises a preconditioned Orthomin method.

22. A computer-implemented method as claimed in claim 1, comprising representing the nodes within a supergrid structure having a plurality of supercells, the number of supercells being less than the number of nodes, each node being assigned to a supercell according to its physical location or the value of a field variable at the node, or using a heuristic method which depends on the values of matrix coefficients, and the supergrid structure comprising at least one layer of supercells, wherein the preconditioner is defined by the equation $B=(I+n.P^{-1}).(P+w)$, or a mathematical rearrangement thereof, wherein I is the unit matrix, P is a block diagonal matrix containing elements which connect nodes within a supergrid layer, and n and w are respectively lower and upper triangular matrices which connect nodes in different supergrid layers, and wherein individual block elements of P are defined by the equation $P=(I+m.T^{-1}).(T+v)$, or a mathematical rearrangement thereof, wherein I is the unit matrix, T is a block diagonal matrix containing elements which connect nodes within a supercell, and m and v are respectively lower and upper triangular matrices which connect nodes in different supercells within the same supergrid layer, and wherein individual block elements of T:

(a) include corresponding elements from the original matrix A, but with the possible addition of corrections which are calculated to make B approximate A as closely as possible;

(b) include non-zero elements which connect at least some nodes to three or more neighbouring nodes; and (c) are small enough, or with a sufficiently low bandwidth, that efficient direct solutions are possible for matrix equations of the form T.q=r, where q and r are vectors.

23. A computer-implemented method as claimed in claim 1, wherein the physical characteristics and initial physical state at an initial time of a dynamically varying fluid reservoir are specified, together with initial boundary conditions at the initial time, and wherein the vector x determined by the method represents the physical state of the fluid reservoir at a discrete time interval dt after the initial time.

24. A computer-implemented method as claimed in claim 23, comprising using the method to update the vector x in each of a plurality of successive time intervals, with the final physical state determined for each time interval acting as the initial physical state for the next time interval, if any, and with boundary conditions optionally varying over time.

25. A computer-implemented method as claimed in claim 1, wherein each physical property comprises a measurable characteristic of the fluid reservoir.

26. A computer-implemented method as claimed in claim 1, wherein the physical characteristics comprise at least one of physical dimensions, density, viscosity, permeability, porosity, elastic modulus and specific heat, and derivatives of these quantities with respect to physical properties.

27. A computer-implemented method as claimed in claim 1, wherein the order of nodes to form the vector x provides the matrix A with a nested block tridiagonal structure except for the presence of at least one extra non-zero element arising from local grid refinement, circular boundary conditions, short circuit links or other extensions to the method that introduce "non-neighbour connections", where the number of extra non-zero elements is small relative to the total number of non-zero elements making up the matrix A.

28. A computer-implemented method as claimed in claim 1, wherein the fluid reservoir comprises an oil reservoir.

29. A computer-implemented method as claimed in claim 26, wherein the physical properties includes pressure.

30. A computer-implemented method as claimed in claim 26, wherein the physical properties includes temperature.

31. A computer-implemented method as claimed in claim 27, wherein the number of extra non-zero elements is less than 5 percent of the total number of non-zero elements making up the matrix A.

32. A computer-implemented method as claimed in claim 27, wherein the number of extra non-zero elements is less than 3 percent of the total number of non-zero elements making up the matrix A.

33. A computer-implemented method as claimed in claim 27, wherein the number of extra non-zero elements is less than 1 percent of the total number of non-zero elements making up the matrix A.

34. An apparatus for estimating the physical state of a physical system with known physical characteristics and subject to specified boundary conditions, comprising:

means for representing the system as a plurality of nodes arranged in N-dimensional space, where N is an integer greater than 1, each node being associated with a set of physical properties, the physical properties associated with the nodes together forming a vector x when arranged in order, with the vector x representing the physical state of the system;

means for receiving physical data relating to the boundary conditions and the physical characteristics of the system, and determining from the received data the relations which must be satisfied by the component elements of the vector x, the number of relations being sufficient to determine the value of all elements of x;

means for receiving an initial estimate $x_0$ of the physical properties which will satisfy the relations; and means for estimating, for each of a plurality of iterations, the change dx in the vector x that results in all of the relations being simultaneously satisfied, and at the end of each iteration updating the current value of x according to x=x+dx;

wherein the means for estimating dx comprises:

means for determining an error vector r, each element of r representing the extent to which one of the required relations is not satisfied for the current value of the vector x;

means for determining a matrix A, each element of A representing an estimate of the rate of variation of an element of r with respect to changes to an element of x;

and means for at least approximately solving the matrix equation A.dx=r to obtain dx for each iteration;

wherein one or more of the means for representing, means for receiving physical data, means for receiving an initial estimate and means for estimating comprises a processor which carries out the recited function;

wherein the method used to solve the matrix equation A.dx=r is iterative, and uses a preconditioning matrix B as an approximation to A;

wherein the order of nodes to form the vector x provides the matrix A with a substantially nested block tridiagonal structure, with at least some inner blocks having non-zero elements which connect an element of r to elements of x from more than three different nodes;

and wherein B is a recursively defined incomplete block L.U factorization of A, with the blocking and recursion substantially mirroring the nested block tridiagonal structure of A.

35. An apparatus for estimating the physical state of a physical system with known physical characteristics and subject to specified boundary conditions, the system being represented as a plurality of nodes arranged in N-dimensional space, where N is an integer greater than 1, each node being associated with a set of physical properties, the physical properties associated with the nodes together forming a vector x when arranged in order, with the vector x representing the physical state of the system, and the apparatus comprising:
- a portion arranged to receive physical data relating to the boundary conditions and the physical characteristics of the system, and determine from the received data the relations which must be satisfied by the component elements of the vector x, the number of relations being sufficient to determine the value of all elements of x;
- a portion arranged to receive an initial estimate $x_0$ of the physical properties which will satisfy the relations; and
- a portion arranged to estimate, for each of a plurality of iterations, the change dx in the vector x that results in all of the relations being simultaneously satisfied, and at the end of each iteration update the current value of x according to x=x+dx;
- wherein the portion arranged to estimate dx comprises:
- a portion arranged to determine an error vector r, each element of r representing the extent to which one of the required relations is not satisfied for the current value of the vector x;
- a portion arranged to determine a matrix A, each element of A representing an estimate of the rate of variation of an element of r with respect to changes to an element of x;
- and a portion arranged to solve at least approximately the matrix equation A.dx=r to obtain dx for each iteration;
- wherein one or more of the portion arranged to receive physical data, the portion arranged to receive an initial estimate, and the portion arranged to estimate comprises a processor which carries out the recited function;
- wherein the method used to solve the matrix equation A.dx=r is iterative, and uses a preconditioning matrix B as an approximation to A;
- wherein the order of nodes to form the vector x provides the matrix A with a substantially nested block tridiagonal structure, with at least some inner blocks having non-zero elements which connect an element of r to elements of x from more than three different nodes;
- and wherein B is a recursively defined incomplete block L.U factorization of A, with the blocking and recursion substantially mirroring the nested block tridiagonal structure of A.

36. A non-transitory tangible computer-readable medium which embodies a program therein which, when executed by a computer, causes the computer to perform a method of estimating the physical state of a physical system with known physical characteristics and subject to specified boundary conditions, comprising a processor carrying out the steps of:
- representing the system as a plurality of nodes arranged in N-dimensional space, where N is an integer greater than 1, each node being associated with a set of physical properties, the physical properties associated with the nodes together forming a vector x when arranged in order, with the vector x representing the physical state of the system;
- receiving physical data relating to the boundary conditions and the physical characteristics of the system, and determining from the received data the relations which must be satisfied by the component elements of the vector x, the number of relations being sufficient to determine the value of all elements of x;
- receiving an initial estimate $x_0$ of the physical properties which will satisfy the relations; and
- for each of a plurality of iterations, estimating the change dx in the vector x that results in all of the relations being simultaneously satisfied, and at the end of each iteration updating the current value of x according to x=x+dx;
- wherein estimating dx comprises:
- determining an error vector r, each element of r representing the extent to which one of the required relations is not satisfied for the current value of the vector x;
- determining a matrix A, each element of A representing an estimate of the rate of variation of an element of r with respect to changes to an element of x;
- and at least approximately solving the matrix equation A.dx=r to obtain dx for each iteration;
- wherein the method used to solve the matrix equation A.dx=r is iterative, and uses a preconditioning matrix B as an approximation to A;
- wherein the order of nodes to form the vector x provides the matrix A with a substantially nested block tridiagonal structure, with at least some inner blocks having non-zero elements which connect an element of r to elements of x from more than three different nodes;
- and wherein B is a recursively defined incomplete block L.U factorization of A, with the blocking and recursion substantially mirroring the nested block tridiagonal structure of A.

* * * * *